US011080109B1

(12) United States Patent
Poirel et al.

(10) Patent No.: US 11,080,109 B1
(45) Date of Patent: Aug. 3, 2021

(54) DYNAMICALLY REWEIGHTING DISTRIBUTIONS OF EVENT OBSERVATIONS

(71) Applicant: Forcepoint, LLC, Austin, TX (US)

(72) Inventors: Christopher Poirel, Baltimore, MD (US); William Renner, Baltimore, MD (US); Eduardo Luiggi, Ellicott City, MD (US)

(73) Assignee: Forcepoint LLC, Austin, TX (US)

( * ) Notice: Subject to any disclaimer, the term of this patent is extended or adjusted under 35 U.S.C. 154(b) by 0 days.

(21) Appl. No.: 16/802,969

(22) Filed: Feb. 27, 2020

(51) Int. Cl.
| *G06F 9/54* | (2006.01) |
| *G06F 9/48* | (2006.01) |
| *G06F 16/215* | (2019.01) |
| *G06F 16/242* | (2019.01) |
| *G06F 16/2453* | (2019.01) |

(52) U.S. Cl.
CPC ............ *G06F 9/542* (2013.01); *G06F 9/4837* (2013.01); *G06F 16/215* (2019.01); *G06F 16/242* (2019.01); *G06F 16/24534* (2019.01)

(58) Field of Classification Search
None
See application file for complete search history.

(56) References Cited

U.S. PATENT DOCUMENTS

| 6,072,875 | A  | 6/2000  | Tsudik |
| 7,107,447 | B2 | 9/2006  | Sanin et al. |
| 7,694,150 | B1 | 4/2010  | Kirby |
| 7,725,565 | B2 | 5/2010  | Li et al. |
| 7,933,960 | B2 | 4/2011  | Chen et al. |
| 8,181,253 | B1 | 5/2012  | Zaitsev et al. |
| 8,312,064 | B1 | 11/2012 | Gauvin |
| 8,424,061 | B2 | 4/2013  | Rosenoer |
| 8,484,066 | B2 | 7/2013  | Miller et al. |
| 8,490,163 | B1 | 7/2013  | Harsell et al. |
| 8,713,633 | B2 | 4/2014  | Thomas |
| 8,826,443 | B1 | 9/2014  | Raman et al. |
| 8,892,690 | B2 | 11/2014 | Liu et al. |
| 8,990,930 | B2 | 3/2015  | Burrell et al. |

(Continued)

FOREIGN PATENT DOCUMENTS

| WO | 2019153581 A1 | 8/2019 |
| WO | WO-2019153581 A1 | 8/2019 |

OTHER PUBLICATIONS

Sean Barnum, Standardized Cyber Threat Intelligence Information with the Structured Threat Information eXpression (STIX) Whitepaper v1.1 (Feb. 20, 2014).

(Continued)

*Primary Examiner* — Charles E Anya
(74) *Attorney, Agent, or Firm* — Terrile, Cannatti & Chambers; Stephen A. Terrile

(57) ABSTRACT

A system, method, and computer-readable medium are disclosed for performing a distribution of interrelated event features operation. The distribution of interrelated event features includes: receiving a stream of events, the stream of events comprising a plurality of events; extracting features from the plurality of events; constructing a distribution of the features from the plurality of events; analyzing the distribution of the features from the plurality of events; and, dynamically reweighting the distribution of the features to scale a number of events contained within the distribution.

14 Claims, 12 Drawing Sheets

(56) References Cited

U.S. PATENT DOCUMENTS

| | | | |
|---|---|---|---|
| 9,015,812 B2 | 4/2015 | Plattner et al. | |
| 9,015,847 B1 | 4/2015 | Kaplan et al. | |
| 9,043,905 B1 | 5/2015 | Allen et al. | |
| 9,137,318 B2 | 9/2015 | Hong | |
| 9,166,999 B1 | 10/2015 | Kulkarni et al. | |
| 9,246,941 B1 | 1/2016 | Gibson et al. | |
| 9,262,722 B1 | 2/2016 | Daniel | |
| 9,342,553 B1 | 5/2016 | Fuller | |
| 9,485,266 B2 | 11/2016 | Baxley et al. | |
| 9,542,650 B2 | 1/2017 | Lospinoso et al. | |
| 9,596,146 B2 | 3/2017 | Coates et al. | |
| 9,665,854 B1 | 5/2017 | Burger et al. | |
| 9,692,762 B2 | 6/2017 | Barkan et al. | |
| 9,755,913 B2 | 9/2017 | Bhide et al. | |
| 9,762,582 B1 | 9/2017 | Hockings et al. | |
| 9,798,883 B1 | 10/2017 | Gil et al. | |
| 9,935,891 B1 | 4/2018 | Stamos | |
| 9,977,824 B2 | 5/2018 | Agarwal et al. | |
| 10,096,065 B2 | 10/2018 | Little | |
| 10,187,369 B2 | 1/2019 | Caldera et al. | |
| 10,237,298 B1 | 3/2019 | Nguyen et al. | |
| 10,270,794 B1 | 4/2019 | Mukerji et al. | |
| 10,275,671 B1 | 4/2019 | Newman | |
| 10,282,702 B2 | 5/2019 | Paltenghe et al. | |
| 10,284,601 B1 | 5/2019 | Bar-Menachem et al. | |
| 10,320,813 B1 | 6/2019 | Ahmed et al. | |
| 10,341,391 B1 | 7/2019 | Pandey et al. | |
| 10,417,454 B1 | 9/2019 | Marom et al. | |
| 10,417,653 B2 | 9/2019 | Milton et al. | |
| 10,419,428 B2 | 9/2019 | Tunnell et al. | |
| 10,432,669 B1 | 10/2019 | Badhwar et al. | |
| 10,579,281 B2 | 3/2020 | Cherubini et al. | |
| 10,713,934 B2 | 7/2020 | Sayavong et al. | |
| 2002/0112015 A1 | 8/2002 | Haynes | |
| 2002/0123865 A1 | 9/2002 | Whitney et al. | |
| 2004/0034582 A1 | 2/2004 | Gilliam et al. | |
| 2004/0044613 A1 | 3/2004 | Murakami et al. | |
| 2005/0198099 A1 | 9/2005 | Motsinger et al. | |
| 2005/0273850 A1 | 12/2005 | Freund | |
| 2006/0048209 A1 | 3/2006 | Shelest et al. | |
| 2006/0053476 A1 | 3/2006 | Bezilla et al. | |
| 2006/0112111 A1 | 5/2006 | Tseng et al. | |
| 2006/0117172 A1 | 6/2006 | Zhang et al. | |
| 2006/0129382 A1 | 6/2006 | Anand et al. | |
| 2006/0195905 A1 | 8/2006 | Fudge | |
| 2006/0225124 A1 | 10/2006 | Kolawa et al. | |
| 2007/0043703 A1 | 2/2007 | Bhattacharya et al. | |
| 2007/0121522 A1 | 5/2007 | Carter | |
| 2007/0225995 A1 | 9/2007 | Moore | |
| 2007/0234409 A1 | 10/2007 | Eisen | |
| 2008/0168002 A1 | 7/2008 | Kagarlis et al. | |
| 2008/0168135 A1 | 7/2008 | Redlich et al. | |
| 2008/0168453 A1 | 7/2008 | Hutson et al. | |
| 2008/0184262 A1* | 7/2008 | Ginis | H04L 41/147 719/314 |
| 2008/0198453 A1 | 8/2008 | LaFontaine et al. | |
| 2008/0244741 A1 | 10/2008 | Gustafson et al. | |
| 2009/0006888 A1 | 1/2009 | Bernhard et al. | |
| 2009/0182872 A1 | 7/2009 | Hong | |
| 2009/0228474 A1 | 9/2009 | Chiu et al. | |
| 2009/0300712 A1 | 12/2009 | Kaufmann et al. | |
| 2010/0057662 A1 | 3/2010 | Collier et al. | |
| 2010/0058016 A1 | 3/2010 | Nikara et al. | |
| 2010/0094767 A1 | 4/2010 | Miltonberger | |
| 2010/0094818 A1 | 4/2010 | Farrell et al. | |
| 2010/0107255 A1 | 4/2010 | Eiland et al. | |
| 2010/0146622 A1 | 6/2010 | Nordstrom et al. | |
| 2010/0205224 A1 | 8/2010 | Palanisamy et al. | |
| 2010/0275263 A1 | 10/2010 | Bennett et al. | |
| 2011/0061093 A1 | 3/2011 | Korkus et al. | |
| 2011/0167105 A1 | 7/2011 | Ramakrishnan et al. | |
| 2011/0307957 A1 | 12/2011 | Barcelo et al. | |
| 2012/0046989 A1 | 2/2012 | Baikalov et al. | |
| 2012/0047575 A1 | 2/2012 | Baikalov et al. | |
| 2012/0079107 A1 | 3/2012 | Williams et al. | |
| 2012/0110087 A1 | 5/2012 | Culver et al. | |
| 2012/0137367 A1 | 5/2012 | Dupont et al. | |
| 2012/0210158 A1 | 8/2012 | Akiyama et al. | |
| 2012/0259807 A1 | 10/2012 | Dymetman | |
| 2013/0013550 A1 | 1/2013 | Kerby | |
| 2013/0031567 A1* | 1/2013 | Nano | G05B 23/0264 719/318 |
| 2013/0054433 A1 | 2/2013 | Giard et al. | |
| 2013/0081141 A1 | 3/2013 | Anurag | |
| 2013/0097662 A1 | 4/2013 | Pearcy et al. | |
| 2013/0102283 A1 | 4/2013 | Lau et al. | |
| 2013/0132551 A1 | 5/2013 | Bose et al. | |
| 2013/0174259 A1 | 7/2013 | Pearcy et al. | |
| 2013/0238422 A1 | 9/2013 | Saldanha | |
| 2013/0305358 A1 | 11/2013 | Gathala et al. | |
| 2013/0317808 A1 | 11/2013 | Kruel et al. | |
| 2013/0320212 A1 | 12/2013 | Valentino et al. | |
| 2013/0340035 A1 | 12/2013 | Uziel et al. | |
| 2014/0075004 A1 | 3/2014 | Van Dusen et al. | |
| 2014/0096215 A1 | 4/2014 | Hessler | |
| 2014/0199663 A1 | 7/2014 | Sadeh-Koniecpol et al. | |
| 2014/0205099 A1 | 7/2014 | Christodorescu et al. | |
| 2014/0214938 A1 | 7/2014 | Bhatt et al. | |
| 2014/0283075 A1 | 9/2014 | Drissel et al. | |
| 2014/0325634 A1 | 10/2014 | Iekel-Johnson et al. | |
| 2015/0082430 A1 | 3/2015 | Sridhara et al. | |
| 2015/0113646 A1 | 4/2015 | Lee et al. | |
| 2015/0154263 A1 | 6/2015 | Boddhu et al. | |
| 2015/0161386 A1 | 6/2015 | Gupta et al. | |
| 2015/0199511 A1 | 7/2015 | Faile, Jr. et al. | |
| 2015/0199629 A1 | 7/2015 | Faile, Jr. et al. | |
| 2015/0205954 A1 | 7/2015 | Jou et al. | |
| 2015/0215325 A1 | 7/2015 | Ogawa | |
| 2015/0220625 A1 | 8/2015 | Cartmell et al. | |
| 2015/0256550 A1 | 9/2015 | Taylor et al. | |
| 2015/0269383 A1 | 9/2015 | Lang et al. | |
| 2015/0288709 A1 | 10/2015 | Singhal et al. | |
| 2015/0324559 A1 | 11/2015 | Boss et al. | |
| 2015/0324563 A1 | 11/2015 | Deutschmann et al. | |
| 2015/0350902 A1 | 12/2015 | Baxley et al. | |
| 2016/0021117 A1 | 1/2016 | Harmon et al. | |
| 2016/0036844 A1 | 2/2016 | Kopp et al. | |
| 2016/0078362 A1 | 3/2016 | Christodorescu et al. | |
| 2016/0092774 A1 | 3/2016 | Wang et al. | |
| 2016/0164922 A1 | 6/2016 | Boss et al. | |
| 2016/0226914 A1 | 8/2016 | Doddy et al. | |
| 2016/0232353 A1 | 8/2016 | Gupta et al. | |
| 2016/0261621 A1 | 9/2016 | Srivastava et al. | |
| 2016/0277360 A1 | 9/2016 | Dwyier et al. | |
| 2016/0277435 A1 | 9/2016 | Salajegheh et al. | |
| 2016/0286244 A1 | 9/2016 | Chang et al. | |
| 2016/0300049 A1 | 10/2016 | Guedalia et al. | |
| 2016/0308890 A1 | 10/2016 | Weilbacher | |
| 2016/0330219 A1 | 11/2016 | Hasan | |
| 2016/0335865 A1 | 11/2016 | Sayavong et al. | |
| 2016/0371489 A1 | 12/2016 | Puri et al. | |
| 2017/0032274 A1 | 2/2017 | Yu et al. | |
| 2017/0053280 A1 | 2/2017 | Lishok et al. | |
| 2017/0063888 A1 | 3/2017 | Muddu et al. | |
| 2017/0070521 A1 | 3/2017 | Bailey et al. | |
| 2017/0104790 A1 | 4/2017 | Meyers et al. | |
| 2017/0116054 A1 | 4/2017 | Boddhu et al. | |
| 2017/0155669 A1 | 6/2017 | Sudo et al. | |
| 2017/0230418 A1 | 8/2017 | Amar et al. | |
| 2017/0255938 A1 | 9/2017 | Biegun et al. | |
| 2017/0279616 A1 | 9/2017 | Loeb et al. | |
| 2017/0286671 A1 | 10/2017 | Chari et al. | |
| 2017/0331828 A1 | 11/2017 | Caldera et al. | |
| 2018/0004948 A1 | 1/2018 | Martin et al. | |
| 2018/0018456 A1 | 1/2018 | Chen et al. | |
| 2018/0024901 A1 | 1/2018 | Tankersley et al. | |
| 2018/0025273 A1 | 1/2018 | Jordan et al. | |
| 2018/0082307 A1 | 3/2018 | Ochs et al. | |
| 2018/0091520 A1 | 3/2018 | Camenisch et al. | |
| 2018/0121514 A1 | 5/2018 | Reisz et al. | |
| 2018/0145995 A1 | 5/2018 | Roeh et al. | |
| 2018/0150570 A1 | 5/2018 | Broyd et al. | |
| 2018/0191745 A1 | 7/2018 | Moradi et al. | |
| 2018/0191857 A1 | 7/2018 | Schooler et al. | |

(56) References Cited

U.S. PATENT DOCUMENTS

| | | | |
|---|---|---|---|
| 2018/0248863 A1 | 8/2018 | Kao et al. | |
| 2018/0285363 A1 | 10/2018 | Dennis et al. | |
| 2018/0288063 A1 | 10/2018 | Koottayi et al. | |
| 2018/0295141 A1 | 10/2018 | Solotorevsky | |
| 2018/0332062 A1 | 11/2018 | Ford | |
| 2018/0336353 A1 | 11/2018 | Manadhata et al. | |
| 2018/0341758 A1 | 11/2018 | Park et al. | |
| 2018/0341889 A1 | 11/2018 | Psalmonds et al. | |
| 2018/0349684 A1 | 12/2018 | Bapat et al. | |
| 2019/0014153 A1 | 1/2019 | Lang et al. | |
| 2019/0034625 A1 | 1/2019 | Ford et al. | |
| 2019/0052660 A1 | 2/2019 | Cassidy et al. | |
| 2019/0166173 A1* | 5/2019 | Zhou | G06F 16/24542 |
| 2019/0289021 A1 | 9/2019 | Ford | |
| 2019/0354703 A1 | 11/2019 | Ford | |
| 2019/0356688 A1 | 11/2019 | Ford | |
| 2019/0356699 A1 | 11/2019 | Ford | |
| 2019/0387002 A1 | 12/2019 | Ford et al. | |
| 2019/0387003 A1 | 12/2019 | Ford et al. | |
| 2019/0392419 A1 | 12/2019 | DeLuca et al. | |
| 2019/0394259 A1* | 12/2019 | Park | G06F 16/24568 |
| 2020/0034462 A1 | 1/2020 | Narayanaswamy et al. | |
| 2020/0036740 A1 | 1/2020 | Ford | |
| 2020/0067790 A1* | 2/2020 | Hsiao | H04L 41/22 |
| 2020/0089692 A1 | 3/2020 | Tripathi et al. | |

OTHER PUBLICATIONS

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSPICO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic. com/Security/pdfs/Semantic_Based_Automated_Reasoning_for_AWS_Access_Policies_Using_SMT.pdf.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-1i.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Marinescu, Dan C., Cloud Computing and Computer Clouds, University of Central Florida, 2012, pp. 1-246.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

* cited by examiner

DYNAMICALLY REWEIGHTING DISTRIBUTIONS OF EVENT OBSERVATIONS

BACKGROUND OF THE INVENTION

Field of the Invention

The present invention relates in general to the field of computers and similar technologies, and in particular to software utilized in this field. Still more particularly, it relates to a method, system and computer-usable medium for constructing a distribution of interrelated event features.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

A system, method, and computer-readable medium for constructing a distribution of interrelated event features.

In one embodiment the invention relates to a method for constructing a distribution of interrelated event features, comprising: receiving a stream of events, the stream of events comprising a plurality of events; extracting features from the plurality of events; constructing a distribution of the features from the plurality of events; analyzing the distribution of the features from the plurality of events; and, dynamically reweighting the distribution of the features to scale a number of events contained within the distribution.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a stream of events, the stream of events comprising a plurality of events; extracting features from the plurality of events; constructing a distribution of the features from the plurality of events; analyzing the distribution of the features from the plurality of events; and, dynamically reweighting the distribution of the features to scale a number of events contained within the distribution.

In another embodiment the invention relates to a computer-readable storage medium embodying computer program code, the computer program code comprising computer executable instructions configured for: receiving a stream of events, the stream of events comprising a plurality of events; extracting features from the plurality of events; constructing a distribution of the features from the plurality of events; analyzing the distribution of the features from the plurality of events; and, dynamically reweighting the distribution of the features to scale a number of events contained within the distribution.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
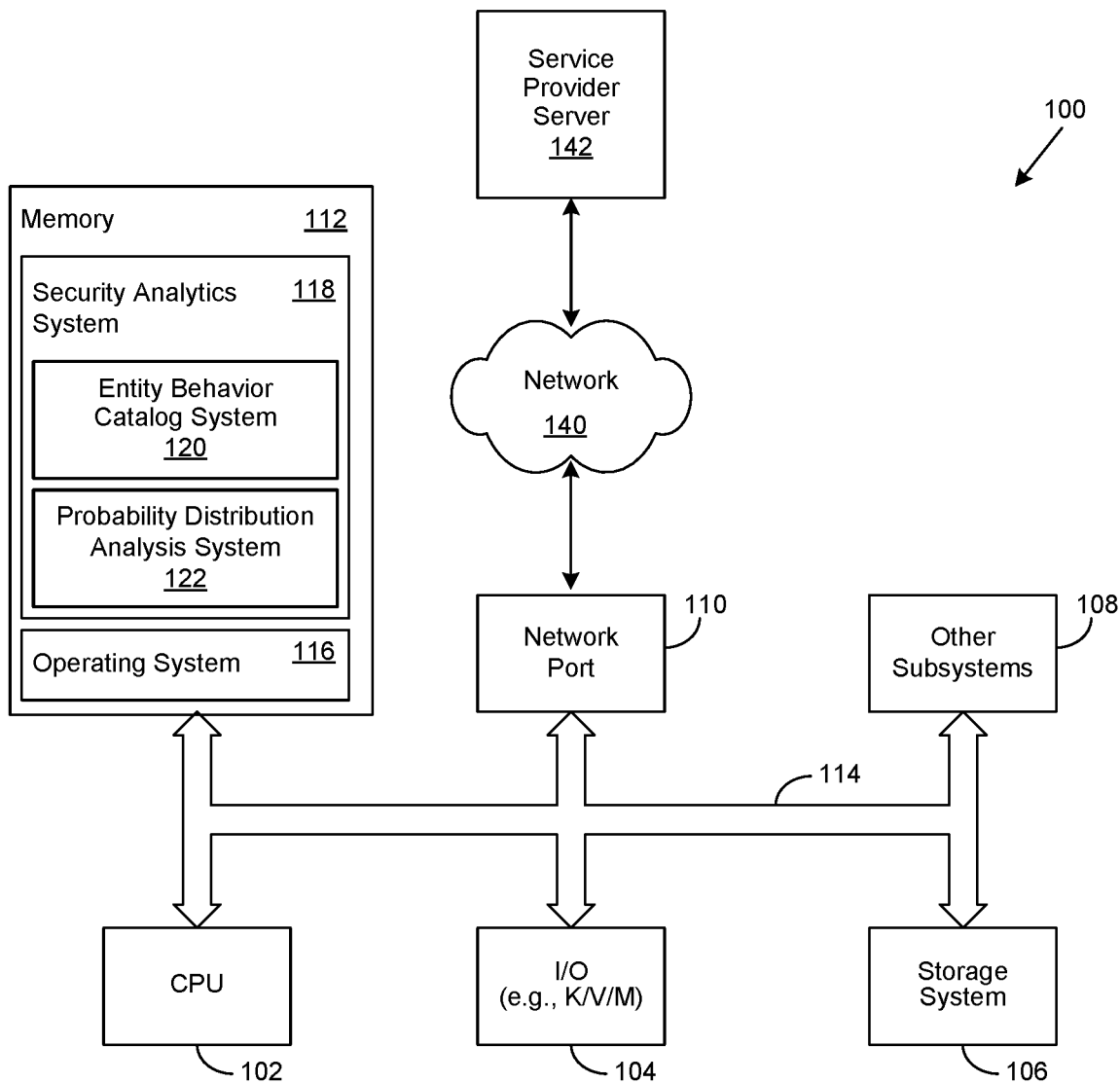
FIG. 1 depicts an exemplary client computer in which the present invention may be implemented.

A method, system and computer-usable medium are disclosed for constructing a distribution of interrelated event features. Certain aspects of the invention reflect an appreciation that social behavior over short time scales is frequently understood in terms of actions, which can be thought of as discrete events in which one individual emits a behavior directed at one or more other entities in his or her environment, possibly including themselves. Certain aspects of the invention likewise reflect an appreciation that the analysis of such events often includes the generation of probability distributions of certain associated items of interest, described in greater detail herein. Likewise, certain aspects of the invention reflect an appreciation that such analysis is often performed in batch mode, or on-demand, as opposed to being performed in real-time in a streaming environment.

Various aspects of the invention reflect an appreciation that many known social behavior analytics approaches are oriented towards probabilistic interpretation of human activity. Various aspects of the invention likewise reflect an appreciation that such approaches may include the use of certain social behavior indicators familiar to those of skill in the art. Furthermore, various aspects of the invention reflect an appreciation that certain definitive social behavior indicators used in such approaches may be captured through the use of targeted rules. Moreover, various aspects of the invention reflect an appreciation that certain, less definitive, social behavior indicators may require some degree of probabilistic inference before their value can be realized.

Additionally, various aspects of the invention reflect an appreciation that while certain social behavior analytics approaches may rely in part on probabilities over observed events, the ability to dynamically understand and adjust the impact of each observation over time would be advantageous. One known naïve approach to adjusting the impact of observations over time is to periodically clear out previously-observed distributions and rebuild distributions from newly-observed events. Certain aspects of the invention reflect an appreciation that the result of implementing such an approach is low historical fidelity until the distribution is built back up. Certain aspects of the invention likewise reflect an appreciation that that such an approach effectively recreates the "cold start" issue that occurs when observation of a new stream of events is first begun.

Another known approach to adjusting the impact of observations over time are certain windowing techniques utilized in various event streaming frameworks. Such approaches allow consumers of an event stream define the historical subset of events to include in some analytic process. However, these approaches are typically implemented as a general framework for message processing and event grouping. Furthermore, the computation of statistical distributions over those events, managing an appropriate decay function, and using those distributions for the purpose of insider threat identification and information protection are not currently known.

Certain aspects of the invention reflect an appreciation that the occurrence of an event may be associated with anomalous, abnormal, unexpected or malicious user behavior enacted by an entity, as described in greater detail herein. Likewise, certain aspects of the invention reflect an appreciation that such user behavior may be associated with one or more processes, each of which may include a series of process steps. Certain aspects of the invention likewise reflect an appreciation that being able to resolve the identity of an entity prior to the next step of such a process being performed may assist in mitigating risk corresponding to certain user behavior associated with a particular event. Furthermore, certain aspects of the invention likewise reflect an appreciation that known approaches to resolving the identity of multiple entities at a latter point in time, such as batch mode processing, are typically unable to resolve the identity of an entity prior to the performance of the next step of such processes.

Likewise, certain aspects of the invention reflect an appreciation that the ability to identify duplicate copies of data associated with an event, and remove them from ingestion and processing pipelines, may assist in avoiding processing the same event multiple times. Various aspects of the invention reflect an appreciation that it is common to configure an event deduplication process to examine certain subsets of fields that may define equivalence between a pair of events, such as timestamps, message body or associated data, subject of context, entities involved, and so forth. However, various aspects of the invention also reflect an appreciation that such "one size fits all" approaches may inadvertently lead to false positive and false negative deduplication of certain events and their associated data.

Certain aspects of the invention reflect an appreciation that other approaches to event deduplication include implementing a dedicated processing pipeline for each event type. Typically, such approaches achieve their desired goals by configuring each pipeline with its own unique deduplication logic. Certain aspects of the invention reflect that while such approaches may work well when there are just a few types of events, their utility, accuracy, and efficiency may be diminished or otherwise adversely affected when the number of different event types expands. In particular, certain aspects of the invention reflect an appreciation that the separate processing pipelines typically employed in such approaches may not necessarily be required when analyzing dozens of different data sources.

Likewise, certain aspects of the invention reflect an appreciation that certain event processing and analysis systems simply ignore the issue of event deduplication altogether and place the onus of deduplication on upstream data sources or providers. However, certain aspects of the invention reflect an appreciation that such a reliance results in the system processing every event it receives, regardless of whether it, and its associated data, are duplicates. Various aspects of the invention reflect an appreciation that such approaches may not pose an issue for some event processing and analysis systems. However, they may become problematic if the upstream data source is unable to guarantee that each event they provide is unique and provided only once. Accordingly, various aspects of the invention reflect an appreciation that it is likely desirable and advantageous for certain high-throughput event processing systems to employ an "exactly once" semantic approach to event deduplication.

Certain aspects of the invention likewise reflect an appreciation that storing documents in a non-relational database, (e.g., open-core Elasticsearch), often precludes the user from using traditional relational database management system (RDBMS) features, such as joining information across multiple tables. Certain aspects of the invention likewise reflect an appreciation that a common approach to address this limitation is to de-normalize additional information onto documents stored in the database. Skilled practitioners of the art will be familiar with denormalization, which is a database optimization technique where redundant data is added to one or more tables. Those of skill in the art will likewise be aware that such denormalization approaches typically avoid costly joins in a relational database.

However, a common problem with denormalization is that denormalized information may eventually become stale, such as when an email address once associated with one person is associated with another at a later time. Accordingly, certain aspects of the invention reflect an appreciation that stale or invalid de-normalized data may lead to inaccurate query results and inaccurate aggregate summary data. Furthermore, certain aspects of the invention reflect an appreciation that computationally-expensive joins typically require indexing some view of the joined information. Moreover, certain aspects of the invention reflect an appreciation that table joins, as typically used in an RDBMS, are not an option with document stores, such as NoSQL databases, key-value stores, and so forth. Other known approaches for managing this type of cross-database referential information include creating a temp table, forming materialized views, and implementing generated columns, all of which are common techniques. However, none of these approaches are currently used for the purpose of resolving the identity of an entity associated with a security event, described in greater detail herein.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, a probability distribution analysis system 122, or both. In certain embodiments, the EBC system 120 may be implemented to catalog entity behavior, as described in greater detail herein. In certain embodiments, the probability distribution analysis system 122 may be implemented to perform event feature probability distribution function (PDF) redistribution operations, as likewise described in greater detail herein.

Figure 2:
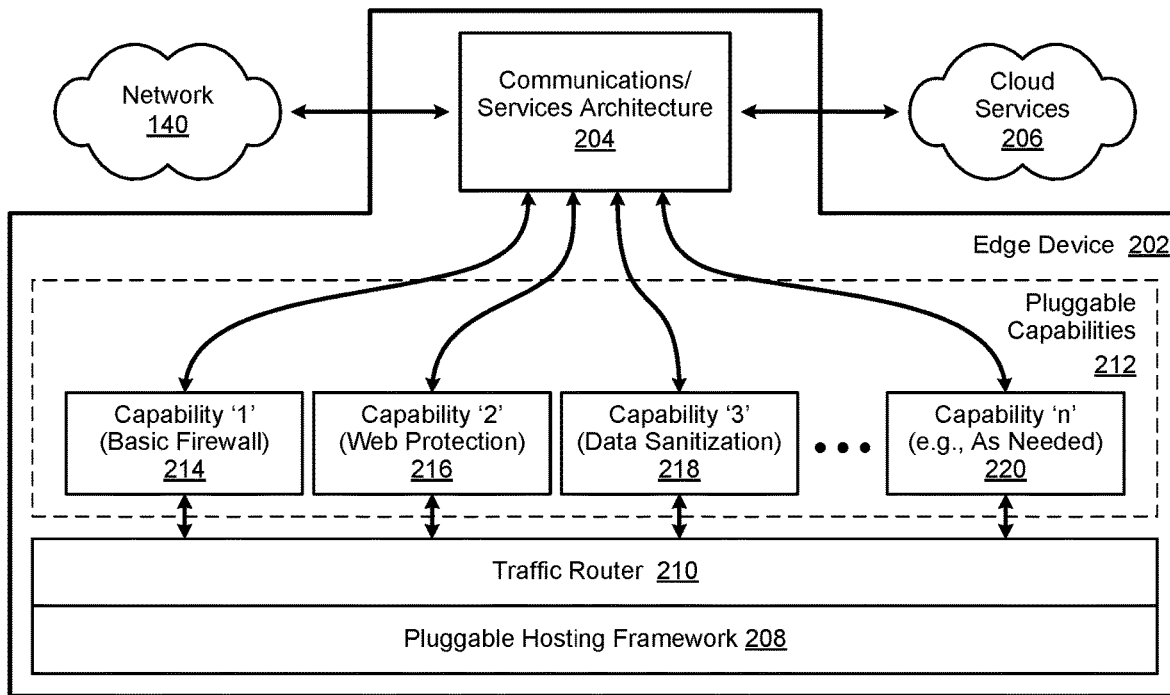
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with providing real-time resolution of the identity of an entity at a particular point in time. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
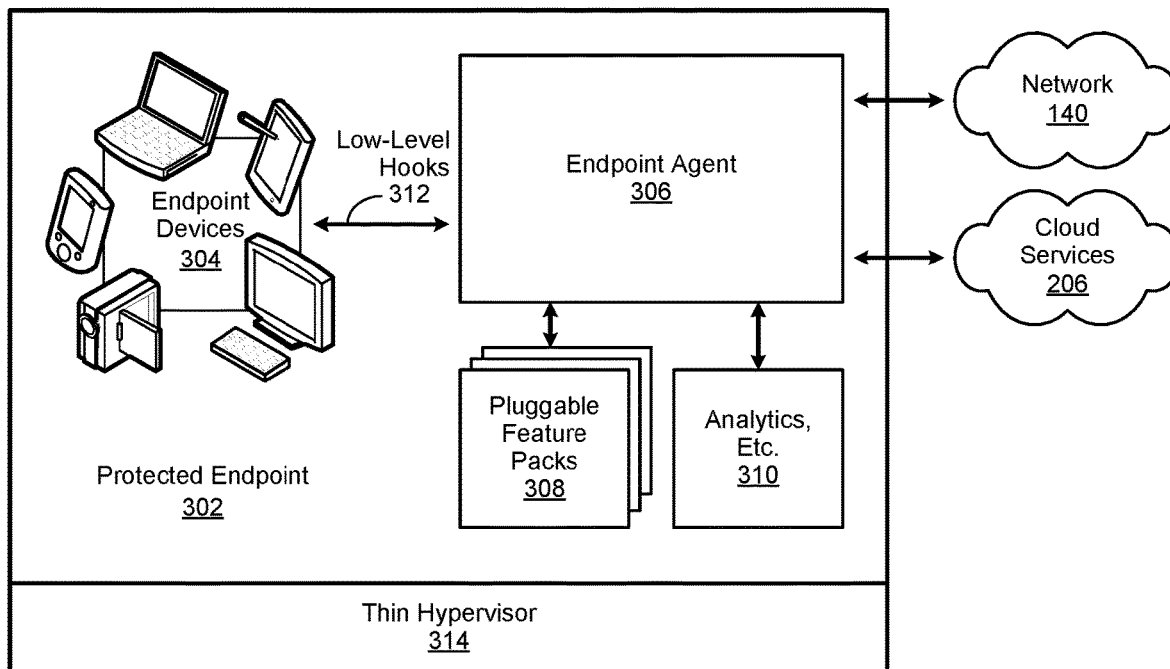
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior, described in greater detail herein.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include an entity's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the operating system level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-needed basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
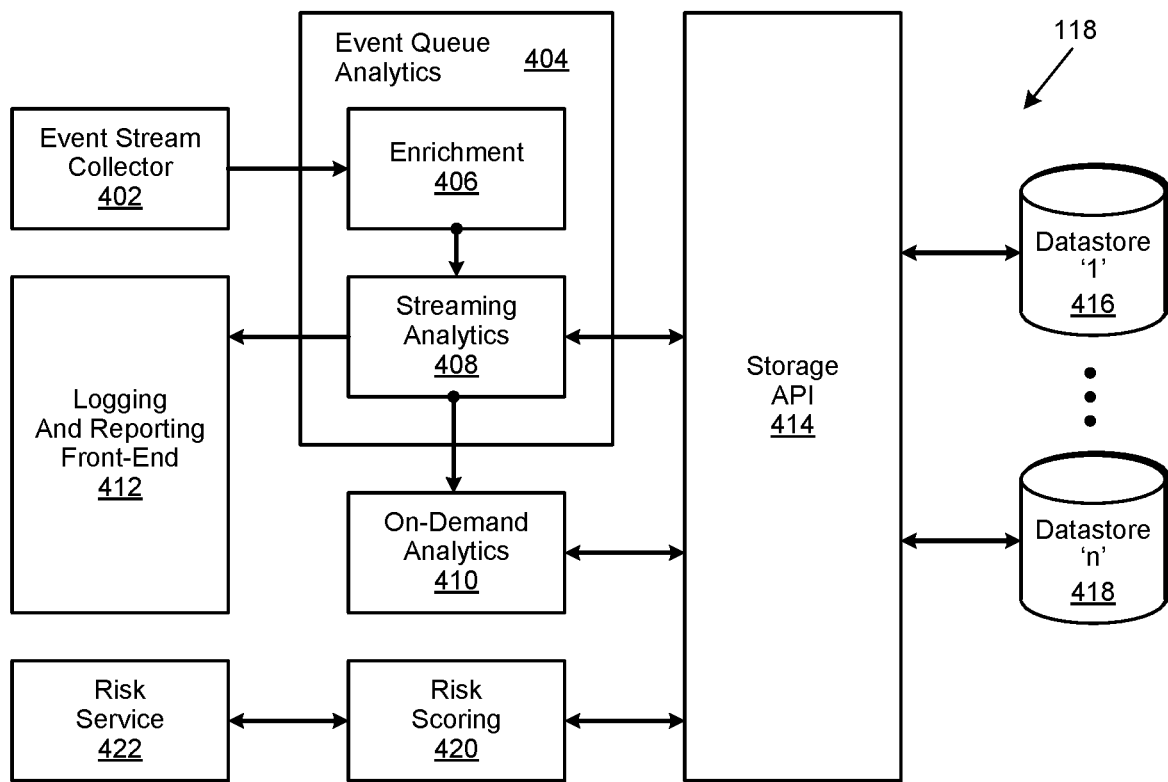
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an adaptive trust profile (ATP), detecting entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an adaptive trust profile (ATP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
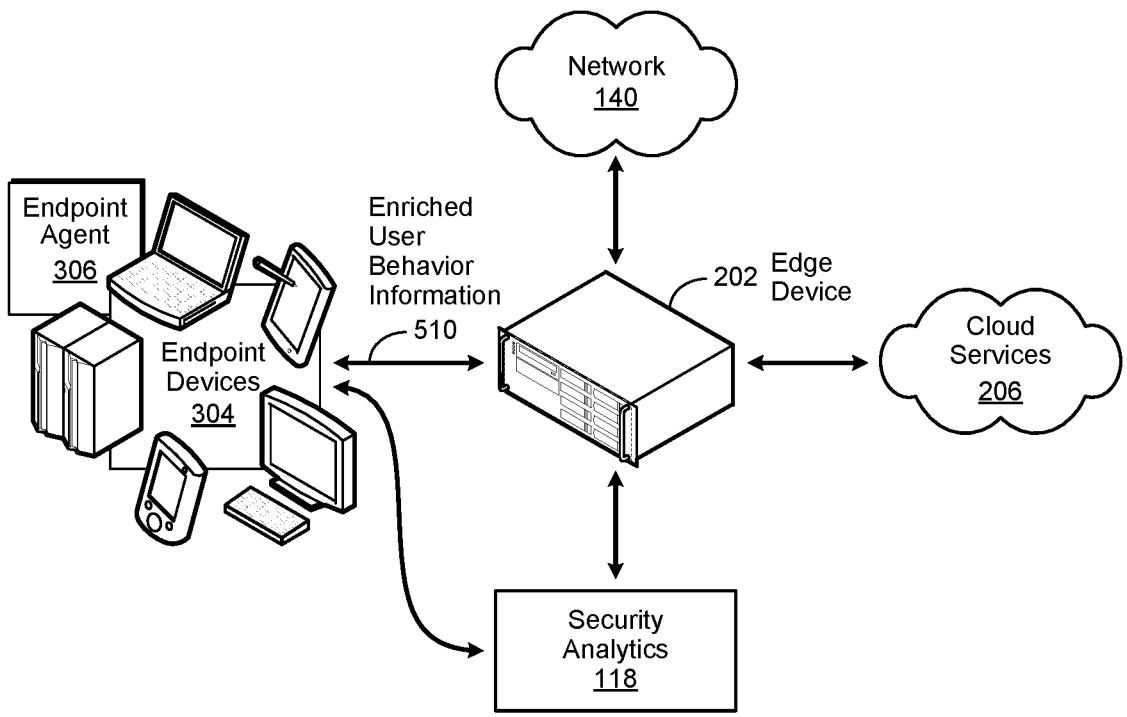
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 512 may be implemented to perform operations associated with providing real-time resolution of the identity of an entity at a particular point in time. In certain embodiments, the security analytics system 512 may be implemented in combination with one or more endpoint agents 306, one or more edge devices 202, cloud services 206, and a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of entity behavior information. In certain embodiments, the security analytics system 512 may be implemented to serve requests for user/resource risk data. In certain embodiments, the edge device 202 and the endpoint agent 306, individually or in combination, may provide certain entity behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality associated with operations associated with providing real-time resolution of the identity of an entity at a particular point in time.

In certain embodiments, a given user behavior may be enriched by an associated endpoint agent 306 attaching contextual information to a request. In one embodiment, the context is embedded within a network request, which is then provided as enriched user behavior information 510. In another embodiment, the contextual information is concatenated, or appended, to a request, which in turn is provided as enriched user behavior information 510. In these embodiments, the enriched user behavior information 510 is unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests are accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with providing real-time resolution of the identity of an entity at a particular point in time.

In certain embodiments, the security analytics system 512 may be implemented in different operational configurations. In one embodiment, the security analytics system 512 may be implemented by using the endpoint agent 306. In another embodiment, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the security analytics system 512 may be implemented to allow the risk-adaptive behavior system to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the risk-adaptive behavior system can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
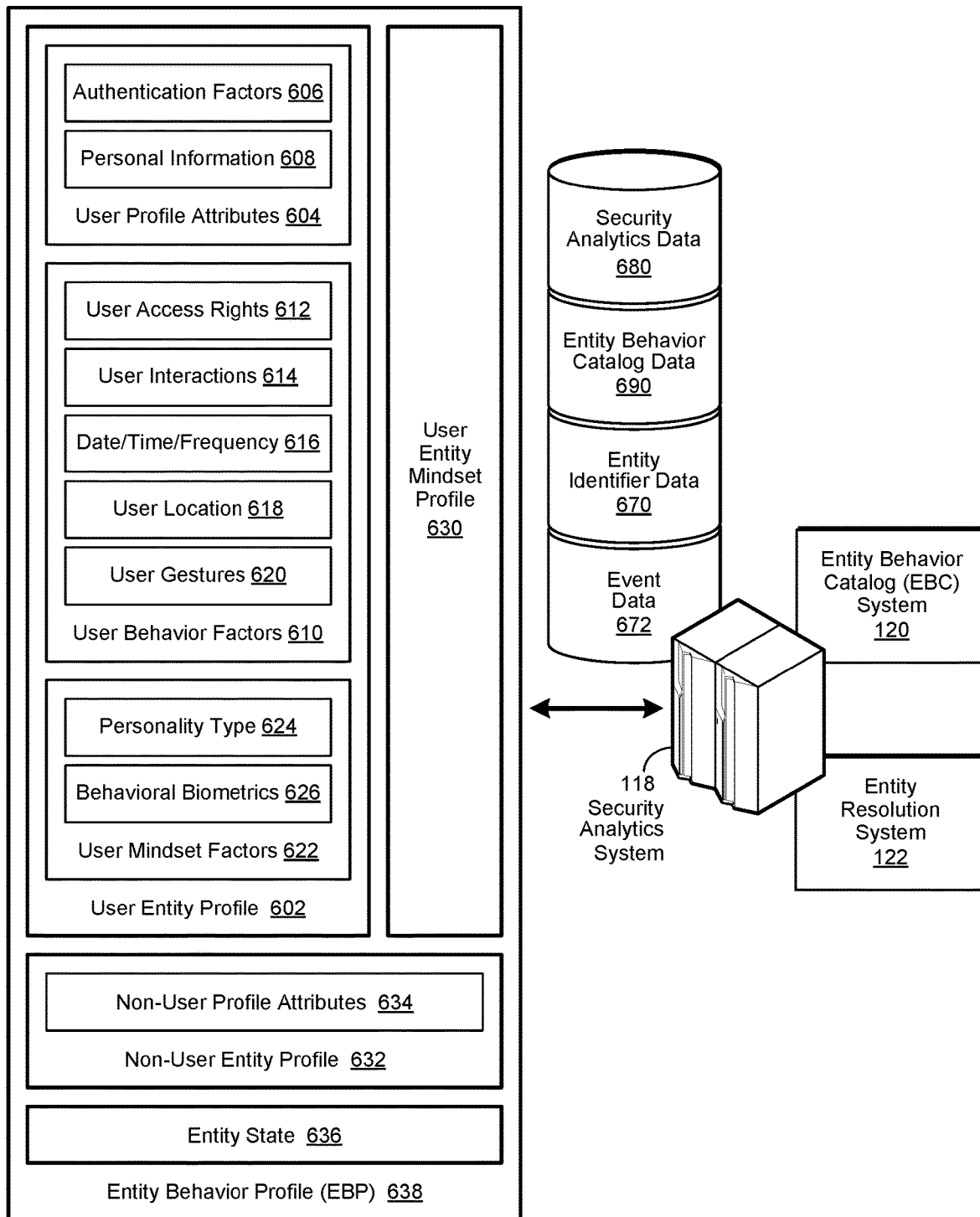
FIG. 6 shows a simplified block diagram of an entity behavior profile (EBP)

FIG. 6 shows a simplified block diagram of an entity behavior profile (EBP) implemented in accordance with an embodiment of the invention. As used herein, an entity behavior profile 638 broadly refers to a collection of information that uniquely describes a particular entity's identity and their associated behavior, whether the behavior occurs within a physical realm or cyberspace. In certain embodiments, an EBP 638 may be used to adaptively draw inferences regarding the trustworthiness of a particular entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user entity behavior, as described in greater detail herein. Examples of a user entity include an individual person, a group of people, an organization, or a government. As likewise used herein, a non-user entity broadly refers to an entity whose identity can be described and may exhibit certain behavior, but is incapable of enacting a user entity behavior. Examples of a non-user entity include an item, a device, such as endpoint and edge devices, a network, an account, a domain, an operation, a process, and an event. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but instead, from another device or system. Certain embodiments of the invention likewise reflect an appreciation that profiling the entity behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an EBP 638 may be implemented to include a user entity profile 602, an associated user entity mindset profile 630, a non-user entity profile 632, and an entity state 636. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 604, user behavior factors 610, user mindset factors 622, or a combination thereof. In certain embodiments, the user profile attributes 604 may include certain user authentication factors 606, described in greater detail herein, and personal information 608.

As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 606, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 610 broadly refers to information associated with a user entity's behavior, whether the behavior occurs within a physical realm or cyberspace. In certain embodiments, user behavior factors 610 may include the user entity's access rights 612, the user entity's interactions 614, and the date/time/frequency 616 of when the interactions 614 are enacted. In certain embodiments, the user behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user mindset factors 622 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of an action performed by an entity. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. Likewise, certain embodiments of the invention include an appreciation that certain user entity gestures 620 and behavioral biometrics 626 are reflective of an individual user's personality type 624. As an example, aggressive, forceful keystrokes combined with an increased heart rate may indicate normal behavior for a particular user when composing end-of-month performance reviews. In various embodiments, certain user entity behavior factors 610, such as user gestures 620, may be correlated with certain contextual information, as described in greater detail herein.

In certain embodiments, a security analytics system 118, described in greater detail herein, may be implemented to include an entity behavior catalog (EBC) system 120. In certain embodiments, the EBC system 120 may be implemented to generate, manage, store, or some combination thereof, information related to the behavior of an associated entity. In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog, may be related to cyber behavior enacted by a user entity, a non-user entity, or a combination thereof.

In certain embodiments, the EBC system 120 may be implemented to use a user entity profile 602 in combination with an entity state 636 to generate a user entity mindset profile 630. As used herein, entity state 636 broadly refers to the context of a particular event or entity behavior. In certain embodiments, the entity state 636 may be a long-term entity state or a short-term entity state. As used herein, a long-term entity state 636 broadly relates to an entity state 636 that persists for an extended interval of time, such as six months or a year. As likewise used herein, a short-term entity state 636 broadly relates to an entity state 636 that occurs for a brief interval of time, such as a few minutes or a day. In various embodiments, the method by which an entity state's 636 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 618, whereas the presence of the user at either office corresponds to an entity state 636. To continue the example, the user may consistently work at their primary office Monday through Thursday, but at their company's corporate office on Fridays. To further continue the example, the user's presence at their primary work location may be a long-term entity state 636, while their presence at their secondary work location may be a short-term entity state 636. Accordingly, a date/time/frequency 616 user entity behavior factor 610 can likewise be associated with user behavior respectively enacted on those days, regardless of their corresponding locations. Consequently, the long-term user entity state 636 on Monday through Thursday will typically be "working at the branch office" and the short-term entity state 636 on Friday will likely be "working at the corporate office."

As likewise used herein, a user entity mindset profile 630 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 604. Likewise, it may be possible to observe a user entity's associated user behavior factors 610, such as their interactions with various systems, when they log-in and log-out, when they are active at the keyboard, the rhythm of their keystrokes, and which files they typically use.

Certain embodiments of the invention reflect an appreciation these behavior factors 610 can be considered to be a behavioral fingerprint. In certain embodiments, the user behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 610 may be implemented to ascertain the identity of a user entity. In certain embodiments, the user behavior factors 610 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an EBP 638 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 632 broadly refers to a collection of information that uniquely describes a non-user entity's identity and their associated behavior, whether the behavior occurs within a physical realm or cyberspace. In various embodiments, the non-user entity profile 632 may be implemented to include certain non-user profile attributes 634. As used herein, a non-user profile attribute 634 broadly refers to data or metadata that can be used, individually or in combination with other non-user profile attributes 634, to ascertain the identity of a non-user entity. In various embodiments, certain non-user profile attributes 634 may be uniquely associated with a particular non-user entity.

In certain embodiments, the non-user profile attributes 634 may be implemented to include certain identity information, such as a non-user entity's network, Media Access Control (MAC), or physical address, its serial number, associated configuration information, and so forth. In various embodiments, the non-user profile attributes 634 may be implemented to include non-user behavior information associated with interactions between certain user and non-user entities, the type of those interactions, the data exchanged during the interactions, the date/time/frequency of such interactions, and certain services accessed or provided.

In various embodiments, the EBC system 120 may be implemented to use certain data associated with an EBP 638 to provide a probabilistic measure of whether a particular electronically-observable event is of analytic utility. In certain embodiments, an electronically-observable event that is of analytic utility may be determined to be anomalous, abnormal, unexpected, or malicious. To continue the prior example, a user may typically work out of their company's corporate office on Fridays. Furthermore, various user mindset factors 622 within their associated user entity profile 602 may indicate that the user is typically relaxed and methodical when working with customer data. Moreover, the user's user entity profile 602 indicates that such user interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 630 may reflect a nervous, fearful, or guilty mindset, which is inconsistent with the entity state 634 of dealing with customer data in general. More particularly, downloading customer data late at night on a day the user is generally not in their primary office results in an entity state 634 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 638 may have a direct bearing on its analytic utility when attempting to determine the trustworthiness of an associated entity and whether or not they represent a security risk. As used herein, the quantity of information contained in a particular EBP 638 broadly refers to the variety and volume of EBP elements it may contain, and the frequency of their respective instances, or occurrences, related to certain aspects of an associated entity's identity and behavior. As used herein, an EBP element broadly refers to any data element stored in an EBP 638, as described in greater detail herein. In various embodiments, an EBP element may be used to describe a particular aspect of an EBP, such as certain user profile attributes 604, user behavior factors 610, user mindset factors 622, user entity mindset profile 630, non-user profile attributes 634, and entity state 636.

In certain embodiments, statistical analysis may be performed on the information contained in a particular EBP 638 to determine the trustworthiness of its associated entity and whether or not they represent a security risk. For example, a particular authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 638 broadly refers to the pertinence of the EBP elements it may contain to certain aspects of an associated entity's identity and behavior. To continue the prior example, an EBP 638 associated with the procurement agent may contain certain user profile attributes 604 related to their title, position, role, and responsibilities, all or which may be pertinent to whether or not they have a legitimate need to access the sales forecast system. In certain embodiments, the user profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 638 is of sufficient quantity and relevancy is a matter of design choice.

Various embodiments of the invention likewise reflect an appreciation that accumulating sufficient information in an EBP 638 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 638 may likewise result in exposure to certain security vulnerabilities. Furthermore, the relevance of such sparsely-populated information initially contained in an EBP 638 first implemented may not prove very useful when using an EBP 638 to determine the trustworthiness of an associated entity and whether or not they represent a security risk.

Figure 7A:
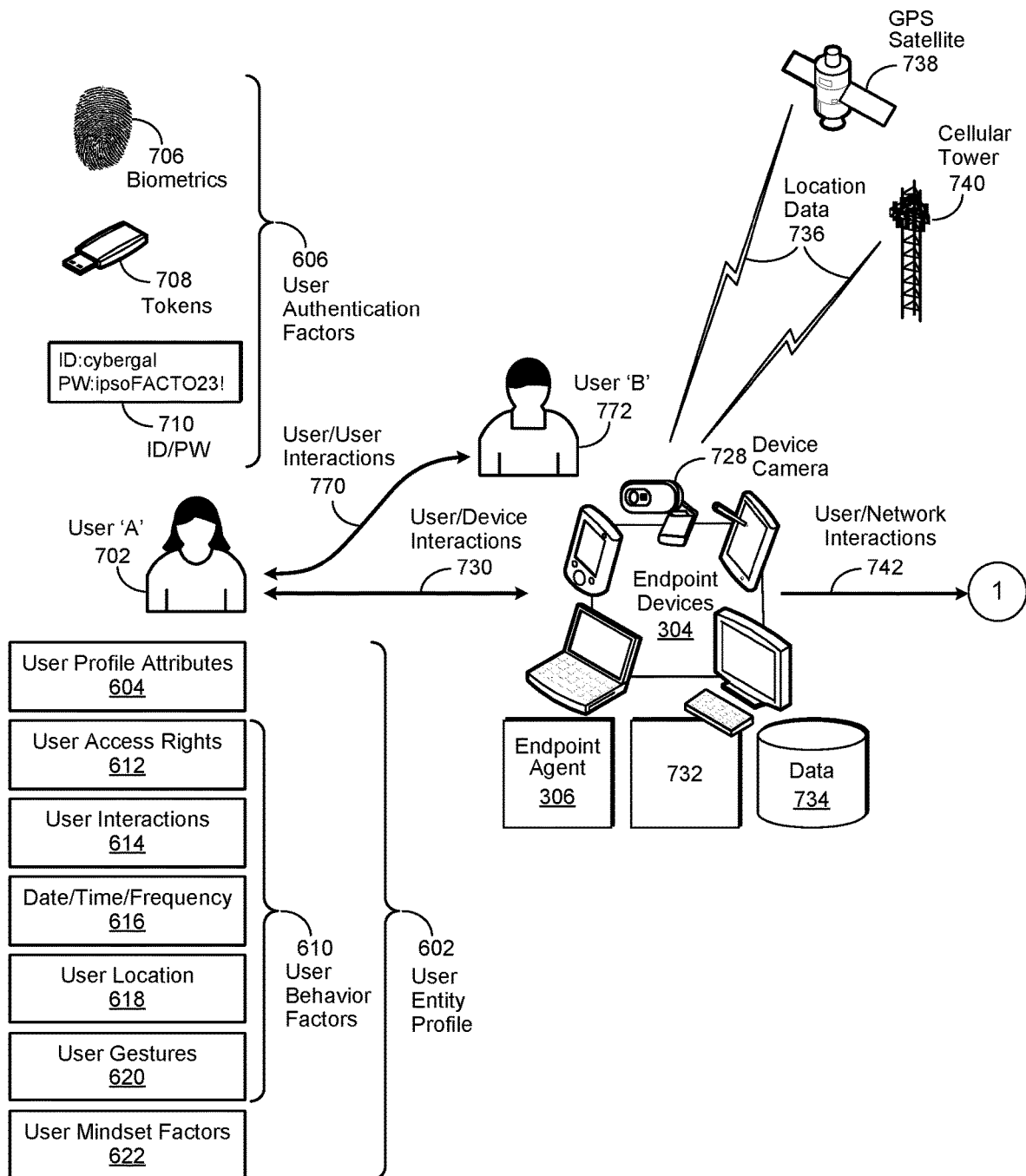
FIGS. 7a and 7b are a simplified block diagram of the operation of a security analytics system.
Figure 7B:
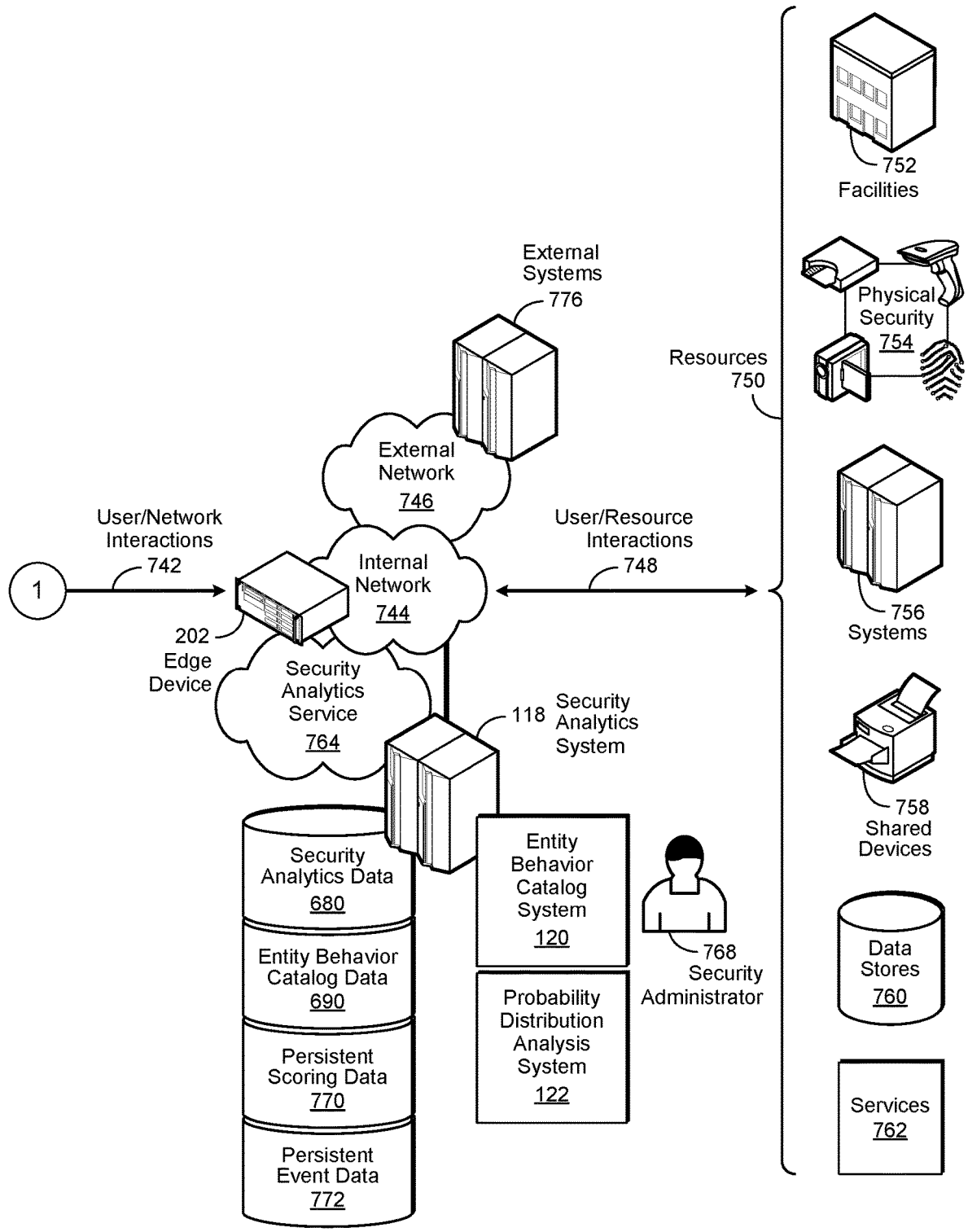

FIGS. 7a and 7b show a block diagram of a security analytics environment implemented in accordance with an embodiment of the invention. In certain embodiments, a security analytics system 118 may be implemented with an entity behavior catalog (EBC) system 120, or a probability distribution analysis system 122 both. In certain embodiments, analyses performed by the security analytics system 118 may be used to identify behavior associated with a particular entity that may be of analytic utility.

In certain embodiments, as likewise described in greater detail herein, the EBC system 120, or the probability distribution analysis system 122, or both, may be used in combination with the security analytics system 118 to perform such analyses. In various embodiments, certain data stored in a repository of security analytics data, or a repository of EBC data 690, or both, may be used by the security analytics system 118, or the EBC system 120, or both, to perform the analyses. Likewise, certain data stored in a repository of persistent scoring data 770, or a repository of persistent event data, or both, may be used by the security analytics system 118, or the probability distribution analysis system 122, or both, to perform the analyses.

In certain embodiments, the entity behavior of analytic utility may be identified at a particular point in time, during the occurrence of an event, the enactment of a user or non-user entity behavior, or a combination thereof. As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 702 or 'B' 772, a group, an organization, or a government. In certain embodiments, a non-user entity may likewise be an item, a device, such as endpoint 304 and edge 202 devices, a network, such as an internal 744 and external 746 networks, a domain, an operation, or a process. In certain embodiments, a non-user entity may be a resource 750, such as a geographical location or formation, a physical facility 752, such as a venue, various physical security devices 754, a system 756, shared devices 758, such as printer, scanner, or copier, a data store 760, or a service 762, such as a service 762 operating in a cloud environment.

As likewise used herein, an event broadly refers to the occurrence of an action performed by an entity. In certain embodiments, the action may be directly associated with an entity behavior, described in greater detail herein. As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

In various embodiments, certain user authentication factors 606 may be used to authenticate the identity of a user entity. In certain embodiments, the user authentication factors 606 may be used to ensure that a particular user entity, such as user 'A' 702 or 'B' 772, is associated with their corresponding user entity profile 602, rather than a user entity profile 602 associated with another user. In certain embodiments, the user authentication factors 606 may include a user's biometrics 706 (e.g., a fingerprint or retinal scan), tokens 708 (e.g., a dongle containing cryptographic keys), user identifiers and passwords (ID/PW) 710, and personal identification numbers (PINs).

In certain embodiments, information associated with such user entity behavior may be stored in a user entity profile 602, described in greater detail herein. In certain embodiments, the user entity profile 602 may be stored in a repository of entity behavior catalog (EBC) data 690. In certain embodiments, as likewise described in greater detail herein, the user entity profile 602 may include user profile attributes 604, user behavior factors 610, user mindset factors 622, or a combination thereof. As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity.

As likewise used herein, a user behavior factor 610 broadly refers to information associated with a user's behavior, whether the behavior occurs within a physical realm or cyberspace. In certain embodiments, the user behavior factors 610 may include the user's access rights 612, the user's interactions 614, and the date/time/frequency 616 of those interactions 614. In certain embodiments, the user behavior factors 610 may likewise include the user's location 618 when the interactions 614 are enacted, and the user gestures 620 used to enact the interactions 614.

In various embodiments, certain date/time/frequency 616 user behavior factors 610 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 604, user behavior factors 610, user mindset factors 622, or a combination thereof, to one or more instants in time. As an example, user 'A' 702 may access a particular system 756 to download a customer list at 3:47 PM on Nov. 3, 2017. Analysis of their user behavior profile indicates that it is not unusual for user 'A' 702 to download the customer list on a weekly basis. However, examination of their user behavior profile also indicates that user 'A' 702 forwarded the downloaded customer list in an email message to user 'B' 772 at 3:49 PM that same day. Furthermore, there is no record in their user behavior profile that user 'A' 702 has ever communicated with user 'B' 772 in the past. Moreover, it may be determined that user 'B' 872 is employed by a competitor. Accordingly, the correlation of user 'A' 702 downloading the customer list at one point in time, and then forwarding the customer list to user 'B' 772 at a second point in time shortly thereafter, is an example of societal time.

In a variation of the prior example, user 'A' 702 may download the customer list at 3:47 PM on Nov. 3, 2017. However, instead of immediately forwarding the customer list to user 'B' 772, user 'A' 702 leaves for a two week vacation. Upon their return, they forward the previously-downloaded customer list to user 'B' 772 at 9:14 AM on Nov. 20, 2017. From an ontological time perspective, it has been two weeks since user 'A' 702 accessed the system 756 to download the customer list. However, from a societal time perspective, they have still forwarded the customer list to user 'B' 772, despite two weeks having elapsed since the customer list was originally downloaded.

Accordingly, the correlation of user 'A' 702 downloading the customer list at one point in time, and then forwarding the customer list to user 'B' 772 at a much later point in time, is another example of societal time. More particularly, it may be inferred that the intent of user 'A' 702 did not change during the two weeks they were on vacation. Furthermore, user 'A' 702 may have attempted to mask an intended malicious act by letting some period of time elapse between the time they originally downloaded the customer list and when they eventually forwarded it to user 'B' 772. From the foregoing, those of skill in the art will recognize that the use of societal time may be advantageous in determining whether a particular entity behavior is of analytic utility. As used herein, mindset factors 622 broadly refer to information used to infer the mental state of a user at a particular point in time, during the occurrence of an event, an enactment of a user behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular operation in a physical realm, cyberspace, or a combination thereof. In certain embodiments, such entity behavior elements may be associated with a user/device 730, a user/network 742, a user/resource 748, a user/user 770 interaction, or a combination thereof.

As an example, user 'A' 702 may use an endpoint device 304 to browse a particular web page on a news site on an external system 776. In this example, the individual actions performed by user 'A' 702 to access the web page are entity behavior elements that constitute an entity behavior, described in greater detail herein. As another example, user 'A' 702 may use an endpoint device 304 to download a data file from a particular system 756. In this example, the individual actions performed by user 'A' 702 to download the data file, including the use of one or more user authentication factors 606 for user authentication, are entity behavior elements that constitute an entity behavior. In certain embodiments, the user/device 730 interactions may include an interaction between a user, such as user 'A' 702 or '13' 772, and an endpoint device 304.

In certain embodiments, the user/device 730 interaction may include interaction with an endpoint device 304 that is not connected to a network at the time the interaction occurs. As an example, user 'A' 702 or '13' 772 may interact with an endpoint device 304 that is offline, using applications 732, accessing data 734, or a combination thereof, it may contain. Those user/device 730 interactions, or their result, may be stored on the endpoint device 304 and then be accessed or retrieved at a later time once the endpoint device 304 is connected to the internal 744 or external 746 networks. In certain embodiments, an endpoint agent 306 may be implemented to store the user/device 730 interactions when the user device 304 is offline.

In certain embodiments, an endpoint device 304 may be implemented with a device camera 728. In certain embodiments, the device camera 728 may be integrated into the endpoint device 304. In certain embodiments, the device camera 728 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 728 may be implemented to capture and provide user/device 730 interaction information to an endpoint agent 306. In various embodiments, the device camera 728 may be implemented to provide surveillance information related to certain user/device 730 or user/user 770 interactions. In certain embodiments, the surveillance information may be used by the security analytics system 118 to detect entity behavior associated with a user entity, such as user 'A' 702 or user '13' 772 that may be of analytic utility.

In certain embodiments, the endpoint device 304 may be used to communicate data through the use of an internal network 744, an external network 746, or a combination thereof. In certain embodiments, the internal 744 and the external 746 networks may include a public network, such as the Internet, a physical private network, a virtual private network (VPN), or any combination thereof. In certain embodiments, the internal 744 and external 746 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 770 interactions may include interactions between two or more user entities, such as user 'A' 702 and 'B' 772. In certain embodiments, the user/user interactions 770 may be physical, such as a face-to-face meeting, via a user/device 730 interaction, a user/network 742 interaction, a user/resource 748 interaction, or some combination thereof. In certain embodiments, the user/user 770 interaction may include a face-to-face verbal exchange. In certain embodiments, the user/user 770 interaction may include a written exchange, such as text written on a sheet of paper. In certain embodiments, the user/user 770 interaction may include a face-to-face exchange of gestures, such as a sign language exchange.

In certain embodiments, temporal event information associated with various user/device 730, user/network 742, user/resource 748, or user/user 770 interactions may be collected and used to provide real-time resolution of the identity of an entity at a particular point in time. Those of skill in the art will recognize that many such examples of user/device 730, user/network 742, user/resource 748, and user/user 770 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 754, a system 756, a shared device 758, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 756 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 736. In certain embodiments, the endpoint device 304 may be configured to receive such location data 736, which is used as a data source for determining the user's location 618. In certain embodiments, the location data 736 may include Global Positioning System (GPS) data provided by a GPS satellite 738. In certain embodiments, the location data 736 may include location data 736 provided by a wireless network, such as from a cellular network tower 740. In certain embodiments (not shown), the location data 736 may include various Internet Protocol (IP) or other network address information assigned to the endpoint 304 or edge 202 device. In certain embodiments (also not shown), the location data 736 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 752, physical security device 754, system 756, or shared device 758. As an example, the endpoint device 304 may be directly connected to an ingress/egress system, such as an electronic lock on a door or an access gate of a parking garage. As another example, the endpoint device 304 may be indirectly connected to a physical security device 754 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various information associated with a user entity profile 602, likewise described in greater detail herein, may be used to perform the risk-adaptive protection operations. In certain embodiments, the user entity profile 602 may include user profile attributes 604, user behavior factors 610, user mindset factors 622, or a combination thereof. In these embodiments, the information associated with a user entity profile 602 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 764. In certain embodiments, the security analytics service 764 may be implemented in a cloud environment familiar to those of skill in the art. In various embodiments, the security analytics system 118 may use data stored in a repository of security analytics data 680, entity behavior catalog data 690, entity identifier data 670, and event data 672, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 8:
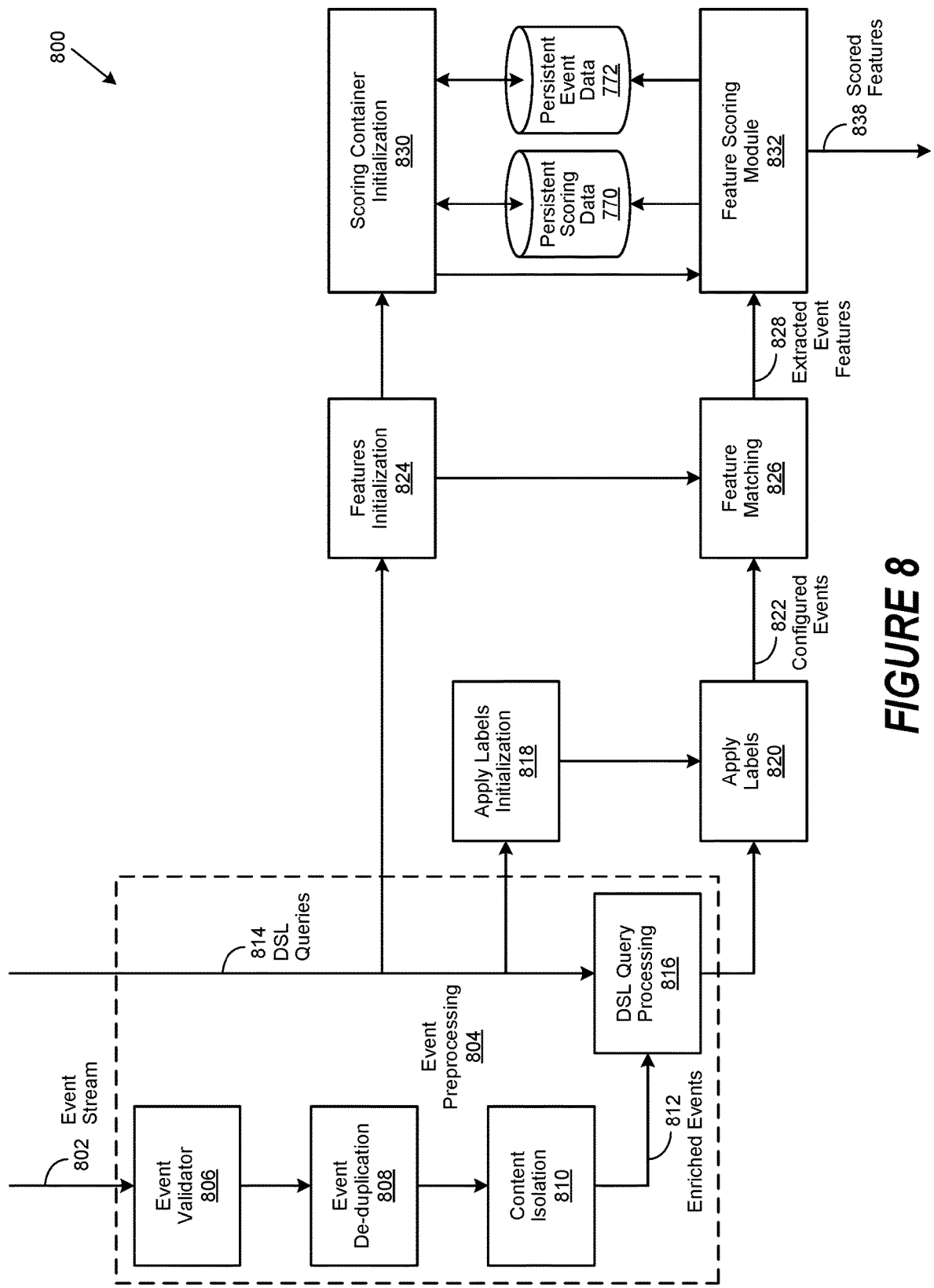
FIG. 8 is a generalized process flow diagram of the performance of event queue analytics operations.

FIG. 8 is a generalized process flow diagram of the performance of event queue analytics operations implemented in accordance with an embodiment of the invention. In various embodiments, a probability distribution analysis system, described in greater detail herein, may be implemented to process certain entity information associated with an event to analyze the probability distribution of its associated features. As used herein, entity information broadly refers to information that can be used to ascertain or corroborate the identity of an entity and its associated behavior, whether the behavior occurs within a physical realm or cyberspace. In certain embodiments, entity information may include user profile attributes, user behavior factors, or user mindset factors, described in greater detail herein. In various embodiments, entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the probability distribution analysis system may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the probability distribution analysis system may be implemented to use information associated with such temporal resolution of an entity's identity to assess the risk associated with a particular entity, at a particular point in time, and adaptively respond with an associated response. In certain embodiments, the probability distribution analysis system may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the probability distribution analysis system may be more oriented in various embodiments to risk adaptation than to security administration.

As used herein, a probability distribution broadly refers to a mathematical function that provides the probabilities of occurrence of different possible outcomes within a sample space. In certain embodiments, the probability distribution is defined by a probability distribution function. In certain embodiments, the probability distribution function may be implemented as a probability density function, a probability mass function, or a cumulative distribution function. A sample space, as likewise used herein, broadly refers to the set of all possible outcomes of a particular phenomenon being observed. In certain embodiments, the phenomenon being observed may be an event, described in greater detail herein. In certain embodiments, the phenomenon being observed is a matter of design choice.

As likewise used herein, a probability density function (PDF), or density of a continuous random variable, broadly refers to a function whose value at any given sample within a particular sample space can be interpreted as providing a relative likelihood that the value of the random variable would equal that sample. A probability mass function (PMF), as used herein, broadly refers to a function that gives the probability that a discrete random variable is exactly equal to a particular value. A cumulative distribution function (CDF), as likewise used herein, broadly refers to a function whose value is the probability that a corresponding continuous random variable, described in greater detail herein, has a value less than or equal to the argument of the function.

In certain embodiments, one or more probability distribution functions may be implemented to describe the distribution of multivariate random variables. In certain embodiments, one or more probability distribution functions may be implemented to determine the relative unlikelihood that the value of a random variable would equal a particular sample. In certain embodiments, the relative unlikelihood that the value of a random variable would equal a particular sample may be classified as an outlier. In certain embodiments, the method by which a particular sample may be classified as an outlier is a matter of design choice. As an example, a particular sample that is more than two standard deviations from the mean of a PDF distribution may be considered to be an outlier. Likewise, a particular sample that is more than one standard deviation from the mean of a PDF distribution may be considered to be an outlier.

In certain embodiments, the sample may be the occurrence of a feature associated with a corresponding event. As used herein, a feature, as it relates to an event, broadly refers to a property, characteristic or attribute of a particular event. As an example, features associated with a corpus of thousands of text-oriented messages (e.g., SMS, email, social network messages, etc.) may be generated by removing low-value words (i.e., stopwords), using certain size blocks of words (i.e., n-grams), or applying various text processing rules. Examples of features associated with an event may include the number of bytes uploaded, the time of day, the presence of certain terms in unstructured content, the respective domains associated with senders and recipients of information, and the Uniform Resource Locator (URL) classification of certain web page visits.

In certain embodiments, such features may be associated with anomalous, abnormal, unexpected or malicious user behavior, as described in greater detail herein. In certain embodiments, the occurrence of an unlikely feature or features associated with a particular entity may result in the generation of a corresponding risk score. In certain embodiments, the generation of a corresponding risk score may include computing the aggregation of occurrences of certain unlikely features with which an entity may be associated. In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

In certain embodiments, the event queue analytics operations 800 may be implemented to determine whether or not a particular document matches a set of queries 814 defined in a domain specific language. As used herein, a document broadly refers to a body of content. In certain embodiments, such content may include text, unstructured data, structured data, graphical images, photographs, audio recordings, video recordings, biometric information, metadata, and so forth. As likewise used herein, a domain specific language (DSL) broadly refers to a computer language specialized to a particular application domain. Examples of DSLs include Hypertext Mark-up Language (HTML) for web pages, Mathematica® for symbolic mathematics, Structured Query Language (SQL) for relational database queries, and Query DSL (QDSL) for Elasticsearch queries. In certain embodiments, a DSL query 814 may reference data, metadata, or a combination thereof, related to an event. In certain embodiments, the DSL query 704 may be expressed in a DSL specific to the domain of temporal events involving the data, metadata, or a combination related to such events.

Referring now to FIG. 8, event queue analytics operations 800 may be initiated in various embodiments by the performance of certain event preprocessing operations 804. In certain embodiments, the event preprocessing operations 804 may be initiated by individual events in an event stream 802 being received and processed by various event enrichment modules to generate enriched events 812. In certain embodiments, these modules may include an event validator 806 module, an event deduplication 808 module, a content isolation 810 module, and a domain specific language (DSL) query processing 816 module, or a combination thereof. As used herein, event enrichment broadly refers to performing certain data enrichment operations and processes associated with enriching data associated with a particular event in the event stream 802. As likewise used herein, data enrichment broadly refers to various operations and processes typically used to enhance, refine or otherwise improve raw data.

Examples of geographic data enrichment may include the use of postal code, county name, longitude and latitude, and political district data, while examples of behavioral data enrichment may include purchase, credit risk, and preferred communication channel data. Likewise, examples of demographic data enrichment may include the use of income, marital status, and education data, while examples of psychographic data enrichment may include interests and political affiliation data.

In certain embodiments, event enrichment may include matching certain incoming events in the event stream 802 with existing event data. In certain embodiments, event enrichment may include deleting certain data associated with certain incoming classified events in the event stream 802. For example, certain data associated with various incoming classified events may be determined to be irrelevant to analyzing the probability distributions of certain interrelated event features. In these embodiments, the method by which data associated with various incoming classified events is determined to be irrelevant is a matter of design choice.

In certain embodiments, event enrichment may include correcting invalid data associated with certain incoming events in the event stream 802. In certain embodiments, event enrichment may include interpolating data associated with certain incoming events in the event stream 802 existing event data. In certain embodiments, the existing event data may be stored in a repository of persistent event data 772.

For example, an event in the event stream 802 may be associated with a first user attaching a binary file to an email addressed to a second user. In this example, the event enrichment operations may include determining the file type of the attachment. Likewise, the event preprocessing operations 804 may include determining the size of the attachment, the date and time of the email, the address of the originating email server, the email addresses of the first and second user, and so forth. In certain embodiments, the event preprocessing operations 804 may include associating annotations or other metadata corresponding to such determinations with the event.

In certain embodiments, the event validator 806 module may be implemented to perform data validation operations on data associated with a particular event. As used herein, data validation broadly refers to various operations and processes associated with data cleansing to ensure data quality. As likewise used herein, data cleansing broadly refers to the process of detecting, correcting, and possible removing, corrupted or inaccurate elements from a data set. In certain embodiments, data cleansing operations may include identifying incomplete, incorrect, inaccurate, or irrelevant data elements and then replacing, modifying or deleting certain data elements that fail to meet certain data use parameters.

In certain embodiments, the event validator 806 module may be implemented to perform data validation operations without the use of statistical data. In certain embodiments, the event validator 806 module may be implemented to validate event timestamps falling within a particular interval of time. In certain embodiments, the interval of time may be user-defined or otherwise configurable. In these embodiments, the definition of the interval of time is a matter of design choice. In certain embodiments, the event validator 806 module may be implemented such that an alias for an entity does not exceed a certain number of characters. In these embodiments, the number of characters is a matter of design choice. In certain embodiments, the event validator 806 module may be implemented that any attested metadata has an expected, corresponding type. In these embodiments, the expected type of metadata is a matter of design choice.

In certain embodiments, the resulting validated event data may be consistent with similar data sets used by a security analytics system to analyze the probability distribution of features associated with certain interrelated events. Certain embodiments of the invention reflect an appreciation that the intent of such data validation is to ensure fitness, accuracy and consistency of data associated with a particular event. Certain embodiments of the invention likewise reflect an appreciation that such fitness, accuracy and consistency is advantageous when performing operations associated with analyzing the probability distribution of features associated with certain interrelated events.

In certain embodiments, the event deduplication 808 module may be implemented to perform operations associated with deduplication, entity resolution, attachment enrichment, domain enrichment, or some combination thereof. As used herein, deduplication operations broadly refer to operations for determining a unique identity for an event based upon certain identifying fields. In certain embodiments, the event deduplication 808 module may be implemented to perform type-dependent deduplication operations.

As used herein, type-dependent event deduplication operations broadly refer to deduplication operations that are performed to determine a unique identity for an event according to its type. As likewise used herein, an event type broadly refers to a particular class of events. In various embodiments, the type of an event may be determined by the presence of certain features that have been previously associated with a particular event type. In these embodiments, the method by which a particular feature is determined to be associated with a particular event type, and the method by which it is determined to be present within an event's data or metadata, is a matter of design choice.

Examples of such event types include the generation, transmission, or receipt of an email, text, or chat message by an entity. Other examples of event types include operating system (OS), firewall, edge device, and web transaction events. Yet other examples of event types include various behaviors enacted by an entity, as described in greater detail herein. Skilled practitioners of the art will recognize that many such event types are possible. Accordingly, the foregoing is not intended to limit the spirit, scope, or intent of the invention.

In certain embodiments, an event's associated features may include one or more identifying fields. In certain embodiments, a particular event type may be recognized by the presence of such identifying fields. In certain embodiments, the identifying fields may include an externally-generated concept, idea, or notion provided by the data source from which the event originated. In various embodiments, the identifying fields may include certain fields deemed to be fundamental to the identity of an event, or identification thereof. In certain embodiments, the value of an identifying field may be taken as imprecise with configurable granularity. For example, events that appear to be similar, and have timestamps within one minute of one another, may be considered duplicates. Conversely, two events may appear to be similar, yet have corresponding timestamps that are several minutes apart, and as a result, not be considered to be duplicates.

As likewise used herein, entity resolution operations broadly refer to operations for resolving certain raw identifiers in input data to known entities. In certain embodiments, the known entities may be used by a probability distribution analysis system, described in greater detail herein, for analyzing probability distributions of interrelated event features. Likewise, as used herein, attachment enrichment operations broadly refer to operations for adding metadata based upon the quantity or type of data associated with an event. In certain embodiments, the metadata may be determined by extension, mime type headers, or mime type, as inferred from content associated with an event. In certain embodiments, the metadata may be internal or external to an organization, a particular business unit, government agency, and so forth. Domain enrichment operations, as likewise used herein, broadly refers to operations for adding metadata based upon a particular realm of Internet administrative autonomy, authority, or control associated with an event.

In certain embodiments, the content isolation 810 module may be implemented to recognize and isolate certain types of recurring content. Examples of such recurring content may include standardized text, such as disclaimers or various types of boilerplate. Other examples of recurring content may include graphical images such as logos, icons, user avatars, and so forth. Various embodiments of the invention reflect an appreciation that the inclusion of such recurring content in certain probability distribution analyses may result in an inaccurate representation of the probability distribution of features associated with a particular event. Accordingly, various embodiments of the invention may not include content that has been isolated by the content isolation 810 module when performing certain probability distribution analysis operations, described in greater detail herein.

In certain embodiments, the event preprocessing operations 804 may include the processing of domain specific language queries 814. In various embodiments, the DSL query processing 816 module may be implemented to process certain DSL queries 814. In certain embodiments, the DSL query 814 may reference data, metadata, or a combination thereof, related to an event. In certain embodiments, the DSL query 814 may be expressed in a DSL specific to the domain of events involving the data, metadata, or a combination thereof, related to such events. In certain embodiments, the DSL query processing 816 module may be implemented to receive enriched events 812 resulting from performance of the event enrichment operations described in greater detail herein.

In certain embodiments, the DSL query processing 816 module may be implemented to determine whether or not a particular document matches a set of DSL queries 814. In certain embodiments, the DSL query processing 816 module may be implemented to provide a streaming query framework. In various embodiments, the streaming query framework may be implemented to extract certain event features in real-time, in batch mode, or on-demand. In certain embodiments, such event features may be associated with anomalous, abnormal, unexpected or malicious user behavior, as described in greater detail herein.

In certain embodiments, the occurrence of an unlikely event feature or features associated with a particular entity may result in the generation of a corresponding risk score. In certain embodiments, the generation of a corresponding risk score may include computing the aggregation of occurrences of certain unlikely features with which an entity may be associated. In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

In certain embodiments, the DSL query processing 816 module may be implemented to receive certain DSL queries 814 that include terms, features, tags, or other items of interest that may be associated with certain interrelated events. As used herein, a term broadly refers to a word, compound word, phrase expression, numeric value, or alphanumeric string, which in certain contexts is associated with a particular meaning. As used herein, a phrase broadly refers to a sequence of terms, or multi-words, familiar to skilled practitioners of the art. In certain embodiments, a term may be associated with an event, a feature of an event, a classification label, a metadata tag label, or a combination thereof.

In certain embodiments, the DSL query processing 816 module may be implemented to determine the commonalities between such DSL queries 814. In certain embodiments, the DSL query processing 816 module may be implemented to lazily evaluate such features, terms, or phrases of interest, as described in greater detail herein. In certain embodiments, the DSL query processing 816 module may be implemented to only evaluate the features or other terms of interest needed for the evaluation of a particular event. In certain embodiments, the DSL query processing 816 module may be implemented to only evaluate the features or other terms of interest once when processing multiple DSL queries 814.

In certain embodiments, the DSL queries 814 may only be processed when the DSL query processing 816 module is first initialized. In certain embodiments the DSL queries 814 may be reprocessed periodically by the DSL query processing 816 module during event collection if they have been added to or otherwise changed. In certain embodiments, such reprocessing may be performed by periodically polling for configuration changes and reinitializing the DSL query processing 816 module as needed. Certain embodiments of the invention reflect an appreciation that such reinitializing of the DSL query processing 816 module facilitates the reduction of a DSL query 814, which involves executing preliminary query steps against reference data (not shown).

As an example, a DSL query 814 may be for events associated with employees whose salary is greater than some amount. In this example, the first step is to identify who those employees may be, and once they are identified, include them into the query when it is "reduced." It will be appreciated that the use of cached results in place of taking this step may result in missing an employee who recently received a raise, and as a result, belongs in the group of identified employees. It will likewise be appreciated that inclusion in the group of identified employees would typically not occur until the DSL query processing 816 module was reinitialized. In certain embodiments, the DSL query processing 816 module may be implemented to periodically recompile and re-reduce certain DSL queries 814. In these embodiments, the method by which the decision is made to periodically recompile and re-reduce DSL queries 814 is a matter of design choice.

In certain embodiments, the receipt of a DSL query 814 may result in certain apply labels initialization 818 operations being performed to initialize an apply labels 820 module. In certain embodiments, the apply labels 820 module may be implemented to classify events received from the DSL query processing 816 module by labeling them with associated classification labels to generate configured events 822. In certain embodiments, the labels applied by the apply labels 820 module may include associated metadata tags. In these embodiments, the method by which the apply labels 820 module selects a classification or metadata tag label, and the associated nomenclature thereof, is a matter of design choice.

As an example, an event may include a user downloading a file from a particular server address. In this example, the event may be classified as a "file download" with corresponding metadata of "server address." Accordingly, the apply labels 820 module may apply both a "file download" classification label and a "server address" metadata tag label to the event. As another example, an event may include an employee using a badge to enter a secured facility after normal work hours. In this example, the event may be classified as "facility access," with corresponding metadata of "secure" and "after hours." Accordingly, the apply labels 820 module may apply a "facility access" classification label as well as "secure" and "after hours" metadata tag labels to the event.

In certain embodiments, the labels applied by the apply labels 820 module may be user-generated, user-edited, or a combination thereof. In various embodiments, certain labels applied by the apply labels 820 module may be applied automatically, corresponding to certain sets of conditions. In certain embodiments, the labels applied by the apply labels 820 module may be automatically or manually removed from certain interrelated events, based on inspection. In certain embodiments, the labels applied by the apply labels 820 module to one event may automatically or manually be added to another event. In certain embodiments, such addition of labels may be based upon a query to provide bulk labeling of certain interrelated events that may share common features or other characteristics. In various embodiments, such addition of labels may be implemented to flag certain interrelated events as part of a review workflow. In certain embodiments, the apply labels operations performed by the apply labels 820 module may result in configured features.

In certain embodiments, the receipt of a DSL query 814 may result in certain features initialization 824 operations being performed to initialize a feature matching 826 module. In certain embodiments, configured events 822 generated by the apply labels 820 module may be processed by the feature matching 826 module to generate matched features. In certain embodiments, the feature matching 826 module may be implemented to perform certain feature extraction operations on the configured features 822 generated by the apply labels 820 module.

As likewise used herein, feature extraction broadly refers to the selection of a subset of features associated with an event. In certain embodiments, the feature extraction operations performed by the feature matching 826 module may result in the generation of extracted event features 828, described in greater detail herein. In certain embodiments, the feature matching 826 module may be implemented to perform transformation operations on a group of features associated with an event to generate a smaller set of derived features.

In certain embodiments, the feature matching 826 module may be implemented to construct derived probabilistic models based upon a particular group of features. In certain embodiments, certain features may be aggregated, from which the derived probabilistic models may be constructed. In certain embodiments, the resulting derived probabilistic models may be aggregated into a scenario. As used herein, a scenario is broadly defined as a group of derived probabilistic models associated with a corresponding group of interrelated events.

Certain embodiments of the invention reflect an appreciation that the generation of derived features may be advantageous as various features associated with a particular event may represent a non-linear pattern or relationship. Likewise, having too many features that may share similar attributes may result in multicollinearity or otherwise confound certain statistical models. Accordingly, the performance of certain feature extraction operations to extract a minimal number of derived features may result in more accurately determining the probability distribution of associated features corresponding to a particular event. In certain embodiments, the feature matching 826 module may be implemented to use certain scoring data stored in a repository of persistent scoring data 770, or event data stored in a repository of persistent event data 772, or a combination thereof, to perform the feature extraction operations.

In certain embodiments, scoring container update operations, described in greater detail herein, may be initiated by the performance of certain scoring container initialization 830 operations to initialize a feature scoring 832 module. In certain embodiments, the scoring container initialization 830 operations may be initiated by the performance of certain features initialization 824 operations. In certain embodiments, the scoring container initialization 830 module may be implemented to determine whether feature matching operations, likewise described in greater detail herein, should be performed on a particular configured feature.

In certain embodiments, the determination of whether or not feature matching operations are performed may be dependent upon on the type of the feature. In certain embodiments, the type of the feature may be determined by an associated feature definition. In these embodiments, the method by which a feature definition is defined, determined, or associated with a corresponding feature is a matter of design choice.

In certain embodiments, events may not be inspected prior to initializing a scoring container. In certain embodiments, a repository of persistent event data 772 may be queried for a random sampling of events containing particular configured features. In certain embodiments, the resulting random sampling of events may be used during various scoring container initialization 830 operations to generate an initial probability distribution of their associated features. In certain embodiments, the initial probability distribution of associated features may likewise be stored in the repository of persistent event data 772 for re-use.

If so, then feature matching operations, described in greater detail herein, are performed on the extracted feature by a feature matching 826 module. If not, or once the feature matching operations are performed by the feature matching 826 module, scoring operations, likewise described in greater detail herein, are performed on the configured feature by a feature scoring 832 module. In certain embodiments, performance of certain feature scoring operations by the feature scoring 832 module results in the generation of scored features 838. In certain embodiments, the scored features may be stored in the repository of persistent event data 772.

Figure 9:
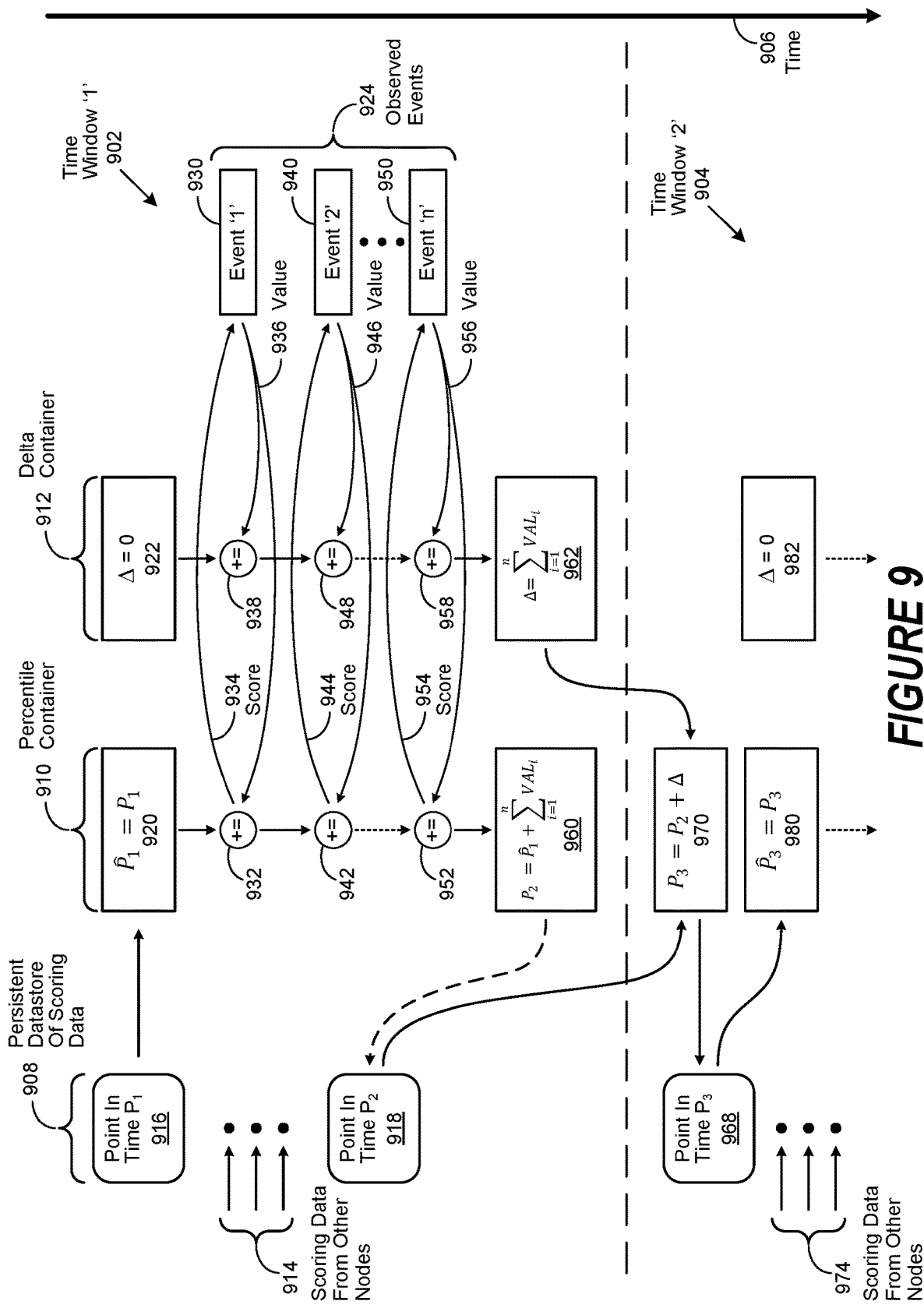
FIG. 9 is a generalized process flow diagram of the performance of scoring container update operations.

FIG. 9 is a generalized process flow diagram of the performance of scoring container update operations implemented in accordance with an embodiment of the invention. Skilled practitioners of the art will be familiar with the concept of containers, which in typical use are a class, a data structure, or an abstract data class whose instances are a collection of other objects. As such, they are used to store objects in an organized way according to certain access rules. In typical implementations, the size of a particular container is dependent upon the number of objects, or elements, it may contain.

As used herein, a scoring container broadly refers to a container implemented to provide an approximation of a probability distribution over the values it contains, based upon samples from that probability distribution. In certain embodiments, a scoring container may be implemented as a percentile 910 container, a delta 912 container, or a combination thereof. As used herein, a percentile 910 container broadly refers to a container used to collect probability distributions of features extracted from certain interrelated events over a particular period of time 906, which are in turn used to perform scoring operations, as described in greater detail herein. In certain embodiments, the extracted features may include an identifier corresponding to the definition of the feature, an extracted value associated with the feature, a score derived from an extracted value associated with the feature, or a combination thereof. As likewise used herein, a delta 912 container broadly refers to a container used to collect probability distributions of features associated with certain interrelated events over a particular period of time 906, which are in turn used to update a persistent datastore of event data, described in greater detail herein. In certain embodiments, the objects collected and stored in a scoring container may include features associated with an event, as described in greater detail herein.

In certain embodiments, scoring container update operations may include the creation of an empty scoring container, the insertion of values, described in greater detail herein, into the scoring container, and deletion of values from the scoring container. In various embodiments, scoring container update operations may likewise include the deletion of all values in a scoring container, accessing certain values in the scoring container, and accessing the number of values in the scoring container. Likewise, scoring container update operations in certain embodiments may include operations associated with providing an approximation of a probability distribution of the values it contains.

In certain embodiments, the scoring container update operations may be implemented to perform construction and maintenance of probability distributions corresponding to certain features associated with an observed event 924, or class of observed events 924, occurring during a particular interval of time 906. In certain embodiments, the construction and maintenance of probability distributions may be performed in real-time, batch mode, or on-demand. In certain embodiments, the resulting probability distributions may be processed by a probability distribution analysis system, described in greater detail herein, to determine the statistical likelihood of those observed events 924 occurring, wherein the likelihoods are driven by empirical data. In certain embodiments, one or more streaming scoring operations may be implemented to determine the probability distributions as the observations of events 924 are made in real-time, in batch mode, or on-demand.

In certain embodiments, multiple instances of a streaming scoring operation may be run for a node cluster to analyze the same event dataset, thereby providing horizontal scalability. As used herein, a node cluster, or cluster of nodes, broadly refers to a set of nodes organized such that each event 924 observed by a probability distribution analysis system, described in greater detail herein, is associated with, and processed by, an individual, corresponding node. In certain embodiments, horizontal scalability may be achieved by merging multiple probability distributions, as described in greater detail herein, into a single probability distribution.

In these embodiments, each node in a cluster maintains its own probability distribution and periodically accesses a persistent datastore of scoring data 908 to provide its new observations of events 924 to a global probability distribution, or pull changes from a global probability distribution of scoring data that has been added by other nodes 914, 974. As used herein, a persistent datastore of scoring data 908 broadly refers to a repository of information implemented to be collaboratively referenced by a cluster of nodes in the performance of their associated scoring container update operations. In various embodiments, scoring data from other nodes 914, 974, or associated with observed events 924, may be added to the persistent datastore of scoring data 908 at certain points in time $P_1$ 916, $P_2$ 918, $P_3$ 968, and so forth during a particular period of time 906.

Consequently, all nodes within a cluster will have eventually-consistent observed data probability distributions. Skilled practitioners of the art will be familiar with the concept of eventual consistency, which is commonly used in distributed computing to achieve high availability while informally guaranteeing if no new updates are made to a particular data item, eventually all accesses to that item will return the last updated value. As commonly implemented, eventual consistency approaches assist in a distributed system eventually maintaining a consistent view of all data the distributed system may maintain, even though the data may temporarily have some inconsistencies. Accordingly, certain embodiments of the invention reflect an appreciation that the persistent datastore of scoring data 908 can serve as a "consistent, global source of truth" when analyzing the probability distribution of interrelated event features in real-time, batch mode, or on-demand.

In certain embodiments, the persistent datastore of event data may be implemented as a relational database management system (RDBMS), a structured query language (SQL) RDBMS, a not only SQL (NoSQL) database, a graph database, or other database approaches familiar to those of skill in the art. In certain embodiments, the persistent datastore of event data may be implemented to maintain distributed concurrency control. As used herein, concurrency control broadly refers to various approaches known to skilled practitioners of the art to ensure correct results for concurrent operations are generated. Certain embodiments of the invention reflect an appreciation that when certain system processes are operating concurrently, they may interact by messaging or sharing accessed data, whether in memory or in storage. Consequently, the consistency of one process may be violated, or compromised, by the operation of another.

As likewise used herein, distributed concurrency control broadly refers to the concurrency control of a system, such as the probability distribution analysis system described in greater detail herein, distributed over a computer network. In certain embodiments, distributed concurrency control may be implemented as row versioning, which skilled practitioners of the art will likewise recognize as a known form of optimistic concurrency control. Likewise, as used herein, optimistic concurrency control (OCC) broadly refers to a various concurrency control approaches applied to transactional systems, such as an RDBMS or software transactional memories. Certain embodiments of the invention reflect an appreciation that OCC optimistically assumes multiple transactions can frequently complete, with some degree of certainty, without interfering with one another.

In certain embodiments, the probability distribution associated with a particular scoring container may be implemented as a continuous probability distribution, a Boolean probability distribution, a one-hot probability distribution, or combination thereof. As used herein, a continuous probability distribution broadly refers to a probability distribution that has a probability distribution function that is continuous. In certain embodiments, the continuous probability distribution may be generated by an associated probability density function. As likewise used herein, a probability density function (PDF), or density of a continuous random variable, broadly refers to a function, the integral of which over any particular range within the sample space is equal to the relative likelihood that the value of the random value would fall within that range. In certain embodiments, a continuous probability distribution may be represented by a cumulative distribution function, which for a particular sample value indicates the unlikelihood of a value being extreme, or more extreme than that value.

Likewise, as used herein, a continuous random variable broadly refers to a variable that can take any real values, in a range which may or may not be bounded. As a result, the variable is continuous within that interval. Accordingly, a continuous random variable may have a continuous range of values, individual values being stored using a fixed-point, floating-point, or fractional representation. As an example, the cost of a transaction in some particular currency may be any value greater than or equal to zero and with no conceptual upper bound, which may be fractional with respect to the designated currency.

In certain embodiments, the continuous probability distribution may be implemented as a numeric value probability distribution. As used herein, a numeric value probability distribution broadly refers to a continuous probability distribution where the value of a variable is referenced as a numerical value. As an example, a military pilot's height may be required to be between 64 and 77 inches tall when standing, 34 to 40 inches tall when sitting, and weigh between 160 and 231 pounds, depending upon their height. In this example, the two real values respectively establishing each physical measurement interval are 64 to 77 inches standing, 34 to 40 inches tall sitting, and weighing 160 to 231 pounds. Accordingly, a pilot that is 69 inches tall standing, 37 inches sitting, and weighs 170 pounds would be described by numeric values that are respectively continuous within each physical measurement interval.

In certain embodiments, various t-Digest approaches may be used to implement the continuous probability distribution for a scoring container. Those of skill in the art will be familiar with t-Digest, which is a probabilistic data structure for estimating percentiles for either distributed data or a stream of data. In general, the t-Digest data structure is a sparse representation of a cumulative distribution function (CDF). In typical implementations, t-Digest data structure ingests data, from which it learns "interesting" points, called centroids, within the ingested data. In certain embodiments, the centroids may indicate where the CDF is changing most quickly within a stream of ingested data. In certain embodiments, the centroids may indicate where the percentiles, may be changing most quickly. In certain embodiments, the centroids may indicate where mass is concentrated within the PDF.

Certain embodiments of the invention reflect an appreciation that such centroids may provide an indication of a potential security threat. As an example, a user may be attempting to download a series of large customer data files. In this example, typical user behavior may indicate that the user rarely, if ever, downloads such files. Instead, they may simply interact with various systems on an ad-hoc or intermittent basis, submitting queries and receiving responses. Consequently, the centroids representing the size of the large customer files the user may be attempting to download, from a percentile perspective, may indicate abnormal behavior, which may in turn represent malicious intent.

As likewise used herein, a Boolean probability distribution broadly refers to a probability distribution that takes on one of two values: true or false. Skilled practitioners of the art will be aware that since a Boolean probability distribution takes on only one of two values, it is a discrete probability distribution instead of continual. Consequently, it does not have a corresponding probability density function. Instead, it has a probability mass function. As an example, a true condition may be represented as '1' and a false condition may be represented as '0'. Accordingly, if 57 out of 100 samples have corresponding true condition, then the resulting probability mass function would have a value of '0.57'.

Likewise, as used herein, a one-hot probability distribution broadly refers to a probability distribution of a group of bits, among which the legal combinations of values are only those with a single high ("1") bit and all the others are low ("0"). To continue a previous example, a particular vehicle may be available in seven different colors, ranging from white to black. Other colors may include yellow, blue, green, red and grey. In this example, a random sample of twenty vehicles may be selected, where none of the selected vehicles was yellow. Accordingly, a one-hot probability distribution would result in the colors white, black, blue, green, red and grey having a single high ("1") bit value and the yellow vehicle having a low ("0") bit value.

Referring now to FIG. 9, the beginning of time window '1' 902 within a period of time 906 is defined by point in time P1 916 and its end is defined by point in time P2 918. Likewise, the beginning of time window '2' 904 is defined by point in time P3 968. In certain embodiments, the percentile 910 container may be implemented to be initialized at point in time $P_1$ 916 by receiving its initial contents from the persistent datastore of scoring data 908. In certain embodiments, the initial values of the percentile 910 container are set at point in time $P_1$ 916 by performing a percentile container initialization 920 operation, as follows:

$$\hat{P}_1 = P_1$$

In certain embodiments, a delta 912 initialization operation 922 may likewise be performed in certain embodiments to set the initial values of the delta 912 container to 0 at point in time $P_1$ 916.

Scoring container update operations are then initiated by the observance of event '1' 930, whose associated features are counted and represented by their corresponding values 936. These values are then respectively added 932, 938 to both the percentile 910 and delta 912 containers. The contents of the percentile 910 container are then used to perform scoring operations 960, as follows:

$$\hat{P}_2 = \hat{P}_1 + \sum_{i=1}^{n} VAL_i$$

which result in the generation of a score 934, which in turn is associated with event '1' 930. In certain embodiments, the score 934 may be implemented to represent the unlikelihood of the occurrence of a particular feature associated with event '1' 930. In certain embodiments, the score may be used by a probability distribution analysis system to generate a risk score. In certain embodiments, the risk score may be implemented to reflect possible anomalous, abnormal, unexpected or malicious behavior by an entity, as described in greater detail herein.

As events '2' 940 through 'n' 950 are observed during time window '1' 902, the values 946 through 956 of their corresponding features are then iteratively added 942 through 948, and 952 through 958, to the percentile 910 and delta 912 containers. Likewise, the contents of the percentile 910 container are iteratively used to perform scoring operations 960, which result in scores 944 through 954 being iteratively associated with events '2' 940 through 'n' 950. As previously described, the resulting scores 944 through 954 may be implemented in certain embodiments to represent the unlikelihood of the occurrence of a particular feature associated with events '2' 940 through 'n' 950.

At point in time $P_2$ 918, which defines the end of time window '1' 902, scoring operations 960 are once again performed on the contents of the percentile 910 container to produce a probability distribution of features associated with the observed events 924. In certain embodiments, the scoring operations 960 may be implemented to generate a composite score associated with events '1' 930 through 'n' 950. In certain embodiments, scores 934 through 954 may be implemented to represent the unlikelihood of the occurrence of a particular feature, or a group of features, associated with events '1' 930 through 'n' 950.

In certain embodiments, the composite score may be used by a probability distribution analysis system in certain embodiments to generate a composite risk score associated with events '1' 930 through 'n' 950. In certain embodiments, the composite risk score may be implemented to reflect possible anomalous, abnormal, unexpected or malicious behavior by an entity, or entities, during time window '1' 902, as described in greater detail herein. As an example, events '1' 930 through 'n' 950 may be associated with the user behavior of a particular entity during time window '1' 902. Likewise, an individual event of events 1' 930 through 'n' 950 may be associated with the user behavior of multiple entities during time window '1' 902. Accordingly, the composite score in certain embodiments may be implemented to represent a composite risk score associated with the entity during time window '1' 902.

Likewise, delta container summation 962 operations are iteratively performed on the contents of the delta 912 container during time window '1' 902, as follows, to show changes in the probability distribution of features as each observed event 924 occurs:

$$\Delta = \sum_{i=1}^{n} VAL_i$$

During time window '1' 902, scoring data from other nodes 914 is iteratively received by, and added to, the persistent datastore of scoring data 908. The contents of the persistent datastore of scoring data 908 at point in time $P_2$ 918 are then added to the sum 970 of the scoring operations shown in block 960 and the results of the delta operations shown in block 962 at the end of time window '1' 902, as follows:

$$P_3 = \hat{P}_2 + \Delta$$

The resulting values are then used to perform scoring data update 970 operations to update the contents of the persistent datastore of scoring data 908 at point in time $P_3$ 968. In turn, the updated values stored in the persistent datastore of scoring data 908 at point in time $P_3$ 968 are used to perform percentile container initialization 980 operations to initialize the percentile 910 container for time window '2' 904, as follows:

$$\hat{P}_3 = P_3$$

Likewise, delta container initialization 982 operations are performed to set the initial values of the delta 912 container to 0 at point in time $P_3$ 968 in time window '2' 904, same as for point in time $P_1$ 916 in time window '1' 902. The operations performed for time window '1' 902 are then repeated for time window '2' 904.

Figure 10:
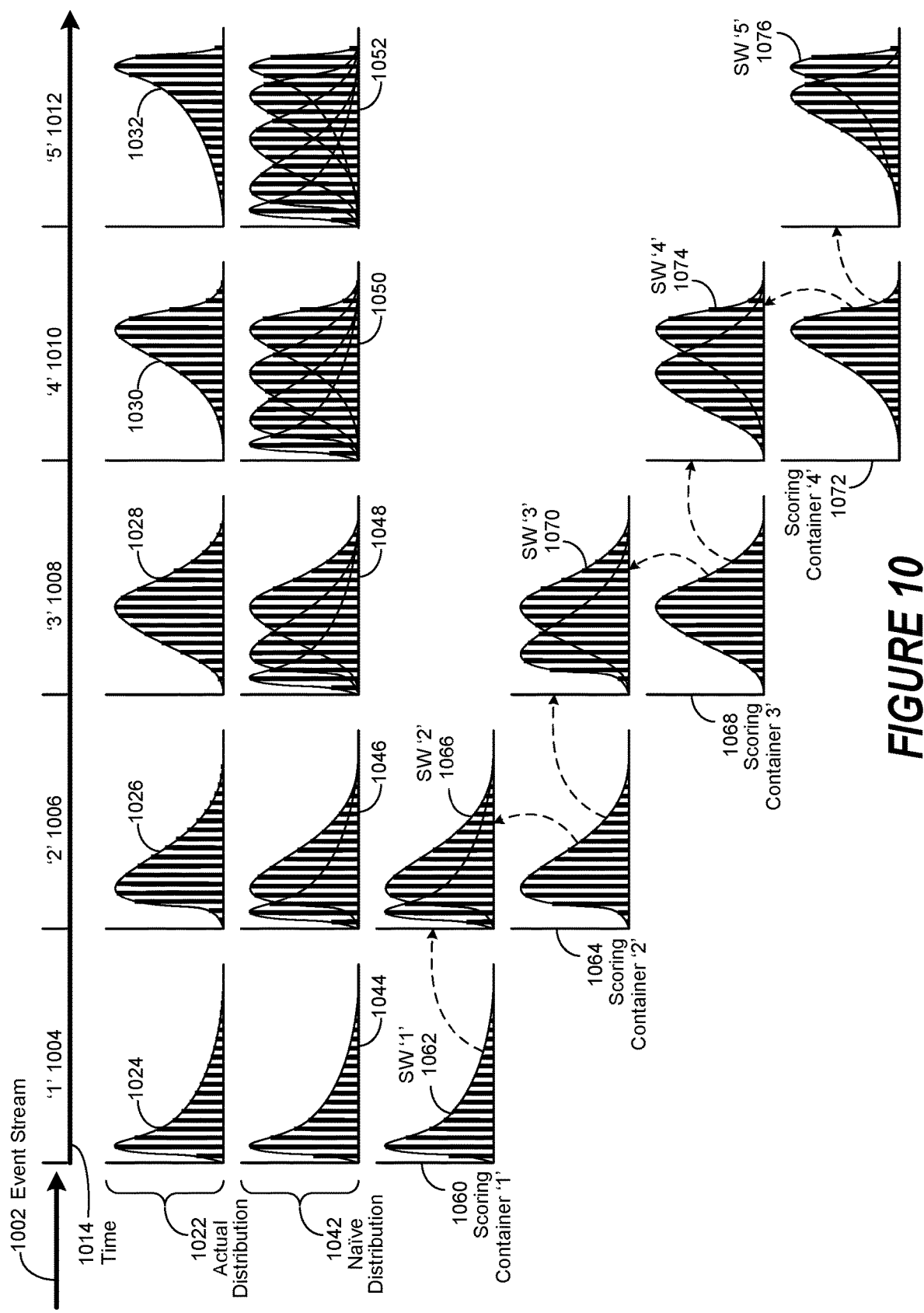
FIG. 10 shows the probability density function (PDF) distribution of certain features over a series of time windows.

FIG. 10 shows the probability density function (PDF) distribution of certain features over a series of time windows implemented in accordance with an embodiment of the invention. In certain embodiments, an event stream 1002 containing interrelated event features may be captured over a particular period of time 1014. In certain embodiments, the event stream 1002 may be processed, as described in greater detail herein, to generate extracted features, which in turn are processed to determine their associated probability distributions. In certain embodiments, the event stream 1002 may be processed by a probability distribution analysis system in real-time, batch mode, or on-demand.

In certain embodiments, the extracted features may be processed to determine their associated probability distributions for a sequence of time windows, such as time windows '1' 1004, '2' 1006, '3' 1008, '4' 1010, and '5' 1012 within a particular period of time 1014. In certain embodiments, the sequence of time windows '1' 1004 through '5' 1012 may be contiguous to one another. As an example, time windows '1' 1004, '2' 1006, '3' 1008, '4' 1010, and '5' 1012 may respectively correspond to hours 1:00 PM through 6:00 PM of the same day. In certain embodiments, the sequence of time windows '1' 1004, '2 1006, '3' 1008, '4' 1010, and '5' 1012 may not be contiguous to one another. For example, time windows 1' 1004, '2 1006, '3' 1008, '4' 1010, and '5' 1012 may respectively correspond to a 24 hour period of time occurring on Wednesdays of sequential weeks.

In certain embodiments, a series of actual 1022 PDF distributions 1024, 1026. 1028, 1030, and 1032, respectively corresponding to the occurrence of certain features associated with a set of interrelated events, are collected for time windows '1' 1004, '2 1006, '3' 1008, '4' 1010, and '5' 1012 occurring within a particular period of time 1014. As an example, the interrelation of the events may be a result of each of the events being associated with the user behavior of a particular user during the time windows '1' 1004, through '5' 1012. However, as shown in FIG. 10, a naïve 1042 PDF distribution 1044, 1046, 1048, 1050, and 1052 of these interrelated event features over time windows '1' 1004 through '5' 1012 would likely result in a blurring of non-stationary modes of the distribution. As used herein, a naïve 1042 distribution broadly refers to a distribution in which a single scoring container, described in greater detail herein, is used to iteratively accrue samples across all involved time windows, such as the time windows '1' 1004 through '5' 1012.

Various embodiments of the invention reflect an appreciation that certain interrelated event features may correspond to indicators of a potential security threat. Certain embodiments of the invention likewise reflect an appreciation that a blurring of non-stationary modes of the PDF distribution of interrelated event features over a given period of time 1002 may make it challenging to identify which features are associated with which threats. Accordingly, PDF distributions of interrelated event features are respectively generated in various embodiments for certain time windows, such as time windows '1' 1004 through '5' 1012.

However, various embodiments of the invention likewise reflect an appreciation that individual PDF distributions of interrelated event features within time windows '1' 1004 through '5' 1012 may likewise fail to indicate certain trends. As an example, certain features may begin to occur more frequently over various time windows '1' 1004 through '5' 1012. Accordingly, the PDF distributions of interrelated event features corresponding to two or more sequential time windows may be combined in certain embodiments to provide a combined PDF probability distribution. In certain embodiments, two or more combined PDF probability distributions may be implemented to provide a staggered window PDF probability distribution. As used herein, a staggered window PDF probability distribution broadly refers to a combined PDF distribution that shares one or more sequential time windows associated with a second combined PDF probability distribution.

As an example, as shown in FIG. 10, the PDF distribution 1024 of interrelated event features associated with time window '1' 1004 is contained in scoring container '1' 1064. However, the PDF distribution 1024 contained in scoring container '1' 1060 provides insufficient data for trend analysis of certain features occurring within staggered window SW '1' 1066 as it has no preceding time window. Instead, it is simply based upon the "naïve" PDF distribution 1044 for time window '1' 1004. However, the PDF distribution stored in scoring container '1' 1060 can be used as a reference for trend analysis of certain features occurring within time window '2' 1006.

To continue the example, the combined PDF distribution for staggered window SW '2' 1066 is based upon the sum of PDF distributions 1024, 1026, respectively stored in scoring containers '1' 1062 and '2' 1064, which in turn respectively correspond to time windows '1' 1004 and '2' 1006. Consequently, the combined PDF distribution for staggered window SW '2' 1070 provides sufficient data for trend analysis of certain features occurring within staggered window SW '3' 1070. Accordingly, the combined PDF distribution for staggered window SW '3' 1070 is based upon processing the PDF distributions 1026, 1028, respectively stored in scoring containers '2' 1064 and '3' 1068, which in turn respectively correspond to time windows '2' 1006 and '3' 1008.

As before, the combined PDF distribution for staggered window SW '3' 1070 provides sufficient data for trend analysis of certain features occurring within staggered window SW '4' 1074. Accordingly, the combined PDF distribution for staggered window SW '4' 1074 is based upon processing the PDF distributions 1028, 1030 respectively stored in scoring containers '3' 1068 and '4' 1072, which in turn respectively correspond to time windows '3' 1008 and '4' 1010. The process in continued to generate a combined PDF distribution for staggered window SW '5' 1076 by processing the PDF distributions 1030, 1032, respectively stored in scoring containers '4' 1072 and '5' (not shown), which in turn respectively correspond to time windows '4' 1010 and '5' 1012.

In certain embodiments, the probability distributions corresponding to time windows '1' 1004 through '5' 1012 may be implemented as cumulative distribution function (CDF) distributions (not shown). In certain embodiments, the CDF distributions may be generated through the use of t-Digest, described in greater detail herein. Certain embodiments of the invention reflect an appreciation the t-Digest is efficient in its use of memory and storage, supports merging, and provides high resolution toward the extremes of the probability distribution. The space efficiency and ability to update t-digests quickly, allowing the maintenance of multiple probability distributions across overlapping, staggered time windows. As an example, the probability of an email containing an attachment with greater than "x" bytes can be tracked over a one-week window, staggering those one-week windows every hour. From the foregoing, those of skill in the art will recognize that inferred cumulative probability distributions will change over time as the underlying probability distributions change.

Figure 11:
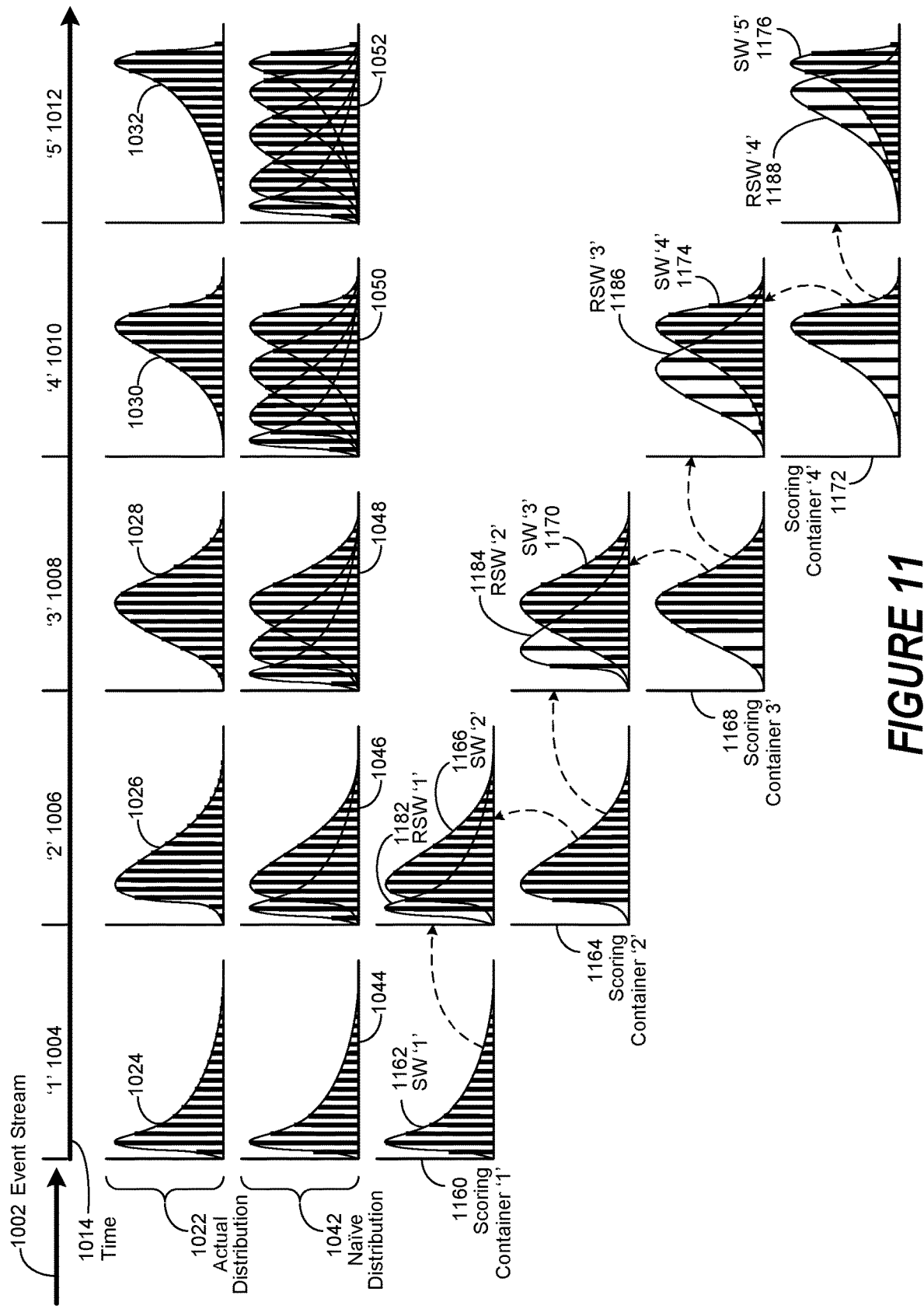
FIG. 11 shows a reweighting of the PDF distribution of certain features over a series of time windows.

FIG. 11 shows a reweighting of the probability density function (PDF) distribution of certain features over a series of time windows implemented in accordance with an embodiment of the invention. In certain embodiments, the reweighting of the PDF distribution may be performed to construct a distribution of interrelated event features. In various embodiments, the reweighting of the PDF distribution may be performed dynamically to scale a certain number of events contained within the distribution. As used herein, dynamic reweighting of a PDF distribution broadly refers to changing the distribution weighting of one or more event features associated with the distribution according to a particular input. In various embodiments, the input may include a feature occurrence count, a feature frequency count, an individual feature, a feature type or class, certain minimum or maximum count limits, and so forth. In certain embodiments, the input may be generated manually, automatically, according to one or more rules, or a combination thereof.

In certain embodiments, the number of events contained within the PDF distribution, the method by which they are selected, the weighting they may each be assigned, and the frequency and extent to which they may be dynamically reweighted, is a matter of design choice. In various embodiments, scoring of an event may involve accruing observed probability distributions of certain associated event features (e.g., the total attachments bytes of an email), as described in greater detail herein. In certain of these embodiments, the resulting accrual of observed probability distributions may be used as summary and enrichment information associated with each event. In certain embodiments such summary and enrichment information may be used to compute aggregate indicators across sets of events.

In certain embodiments, these distributions may be used to indicate how unusual a given observation is, compared to a pertinent set of observations. Skilled practitioners of the art will be aware that in probability theory, such sets of observations are known as "conditioning sets." However, certain embodiments of the invention reflect an appreciation that accrued probability distributions typically become rigid, or "burned in," after a sufficient number of observations (i.e., processed events) have been made and new observations may have little or no influence. For example, the cumulative distribution of "total attachment bytes" associated with email and chat events may be tracked, collected, and processed. After hundreds of thousands of such observations, new observations typically have little to no impact on the distribution, obscuring the rarity of events that may be of analytical utility.

Accordingly, accrued probability distributions of event observations may be implemented in certain embodiments to represent a shorter history of observations, allow more recent observations to have a greater effect on the distributions, or both. In various embodiments, certain accrued probability distributions of event observations may be periodically refreshed within a sliding observation window. In certain embodiments, the periodic refreshing of a particular accrued probability distribution of event observations may be performed manually, automatically, according to certain rules, or a combination thereof. In these embodiments, the frequency of such periodic refreshing, and the time interval between each refreshing, is a matter of design choice.

In certain embodiments, the observation count used for a particular accrued probability distribution may be reduced. In certain embodiments, the observation count of one or more accrued probability distributions may be uniformly reduced, or scaled, to define an empirical distribution. To continue the preceding example, after building a distribution of "total attachment bytes" over a hundred thousand emails, the distribution can then be manually reduced to represent the same probabilities, but as if only a thousand emails were observed to generate it. Accordingly, it becomes possible to take into account the prior empirical distribution, by reducing the observation count, to control how much influence they may have when modeling future observations.

In certain embodiments, the scaling of one or more accrued probability distributions may include a particular period of time. As an example, the period of time during which one or more probability distributions are accrued may be scaled from several months to several weeks. In certain embodiments, the divergence of recent observations against previously "burned in" probabilities may be used as a metric for how far recent observations have drifted from previously-observed distributions.

In various embodiments, an analytic window may be implemented such that certain events are allowed to age out of their respective distributions over time. Accordingly, in certain of these embodiments, the conditions set on a particular probability distribution may be modified by simply maintaining a predetermined historical time interval delta of activity. In various embodiments, a decay function may be implemented for observations that contribute to one or more probability distributions, thereby allowing older observations to have a smaller, eventually even zero, effect on the current distribution. In certain of these embodiments, the decay function may be implemented to be configurable for each type, or class, or distribution. For example, the decay function associated with tracking email attachment sizes may look very different from the historical use of internal keywords, since attachment size distributions likely change on a slower schedule than a custom internal keyword list.

In various embodiments, the refreshing, reduction, scaling, duration, or decay of a particular observation count may be performed manually, automatically, according to certain rules, or a combination thereof. Various embodiments of the invention reflect an appreciation that such periodic refreshing, reduction, scaling, duration, or decay of observation counts, or a combination thereof, may be particularly useful in the performance of certain security analytics operations, described in greater detail herein. Certain embodiments of the invention reflect an appreciation that the periodic refreshing, reduction, scaling, duration, or decay of observation counts, or a combination thereof, may likewise be applicable, and used advantageously, for various other probability distribution analysis approaches known to those of skill in the art.

Referring now to FIG. 11, an event stream 1002 containing interrelated event features may be captured in certain embodiments over a particular period of time 1014. In certain embodiments, the event stream 1002 may be processed, as described in greater detail herein, to generate extracted features, which in turn are processed to determine their associated probability distributions. As likewise described in greater detail herein, the extracted features may be processed in certain embodiments to determine their associated probability distributions for a sequence of time windows, such as time windows '1' 1004, '2' 1006, '3' 1008, '4' 1010, and '5' 1012. In certain embodiments, the sequence of time windows '1' 1004 through '5' 1012 may be contiguous to one another, or not, as likewise described in greater detail herein.

As described in greater detail herein, a series of actual 1022 PDF distributions 1024, 1026. 1028, 1030, and 1032, respectively corresponding to the occurrence of certain features associated with a set of interrelated events, are respectively collected in certain embodiments for time windows '1' 1004, '2' 1006, '3' 1008, '4' 1010, and '5'. As likewise described in greater detail herein, a naïve 1042 PDF distribution 1044, 1046, 1048, 1050, and 1052 of these interrelated event features over time windows '1' 1004 through '5' 1012 would likely result in a blurring of non-stationary modes of the distribution. Certain embodiments of the invention reflect an appreciation that such a blurring of non-stationary modes of the PDF distribution of interrelated event features over a given period of time 1014 may result in their associated probabilities becoming "burned in." Certain embodiments of the invention likewise reflect an appreciation that the "burning in" of such probabilities typically result in making it challenging to identify which features may be associated with a particular security threat.

Various embodiments of the invention likewise reflect an appreciation that individual PDF distributions of interrelated event features within time windows '1' 1004 through '5' 1012 may likewise fail to indicate certain trends. Accordingly, the PDF distributions of interrelated event features corresponding to two or more sequential time windows may be combined in certain embodiments to provide a combined PDF probability distribution. In certain embodiments, two or more combined PDF probability distributions may be implemented to provide a staggered window PDF probability distribution, described in greater detail herein.

As an example, as shown in FIG. 11, the PDF distribution 1024 of interrelated event features associated with time window '1' 1004 is contained in scoring container '1' 1064. However, the PDF distribution 1024 contained in scoring container '1' 1160 provides insufficient data for trend analysis of certain features occurring within staggered window SW '1' 1066 as it has no preceding time window. Instead, it is simply based upon the "naïve" PDF distribution 1044 for time window '1' 1004. However, the PDF distribution stored in scoring container '1' 1160 can be used as a reference for trend analysis of certain features occurring within time window '2' 1006.

However, combining the naïve PDF distribution 1044 for time window '1' 1004 with the PDF distribution 1026 of interrelated event features associated with time window '2' 1006 would likely result in blurring of the non-stationary modes of their respective PDF distributions. Accordingly, the PDF distribution of interrelated event features associated with staggered window SW '1' 1162 is processed, as described in greater detail herein, to generate a redistributed PDF distribution RSW '1' 1182. In turn, the redistributed PDF distribution RSW '1' 1182 is then combined with the PDF distribution associated with staggered window SW '2' 1166.

Certain embodiments of the invention reflect an appreciation that combining PDF distributions respectively associated with the redistributed staggered window RSW '1' 1182 and the staggered window SW '2' 1166 will result in more emphasis being given to interrelated event features associated with staggered window SW '2' 1166. Likewise, less emphasis will be given to interrelated event features associated with staggered window SW '1' 1162 if it had been used in its original state. Consequently, the PDF distribution stored in scoring container '2' 1164 may be used as a more accurate reference for trend analysis of certain features occurring within time window '2' 1006 as greater emphasis is given to the occurrence of more recent features than those that occurred in time window '1' 1004.

To continue the example, the PDF distribution of interrelated event features stored in scoring container '2' 1164 is then processed to generate a redistributed staggered window RSW '2' 1184. In turn, the redistributed staggered window RSW '2' 1184 is then combined with staggered window SW '3' 1170. As shown in FIG. 11, the PDF distribution resulting from the combination of the redistributed staggered window RSW '2' 1184 with staggered window SW '3' 1170 is then stored in scoring container '3' 1168. As before, the PDF distribution stored in scoring container '3' 1168 may be used as a more accurate reference for trend analysis of certain features occurring within time window '3' 1008 as greater emphasis is given to the occurrence of more recent features than those that occurred in time windows '1' 1004 and '2' 1006.

To continue the example further, the PDF distribution of interrelated event features stored in scoring container '3' 1168 is then processed to generate a redistributed staggered window RSW '3' 1186. In turn, the redistributed staggered window RSW '3' 1186 is then combined with staggered window SW '4' 1174. As shown in FIG. 11, the PDF distribution resulting from the combination of the redistributed staggered window RSW '3' 1186 with staggered window SW '4' 1174 is then stored in scoring container '4' 1172. As before, the PDF distribution stored in scoring container '4' 1172 may be used as a more accurate reference for trend analysis of certain features occurring within time window '4' 1010 as greater emphasis is given to the occurrence of more recent features than those that occurred in time windows '1' 1004, '2' 1006, and '3' 1008.

To continue the example yet further, the PDF distribution of interrelated event features stored in scoring container '4' 1172 is then processed to generate a redistributed staggered window RSW '4' 1188. In turn, the redistributed staggered window RSW '4' 1188 is then combined with staggered window SW '5' 1176, and the preceding process is repeated for each subsequent time window occurring over time 1014. Those of skill in the art will recognize the use of a redistributed staggered window associated with past time windows, in combination with an associated staggered window for a current time window, will typically result in a more accurate reference for trend analysis of certain features occurring within future time windows.

Figure 12A:
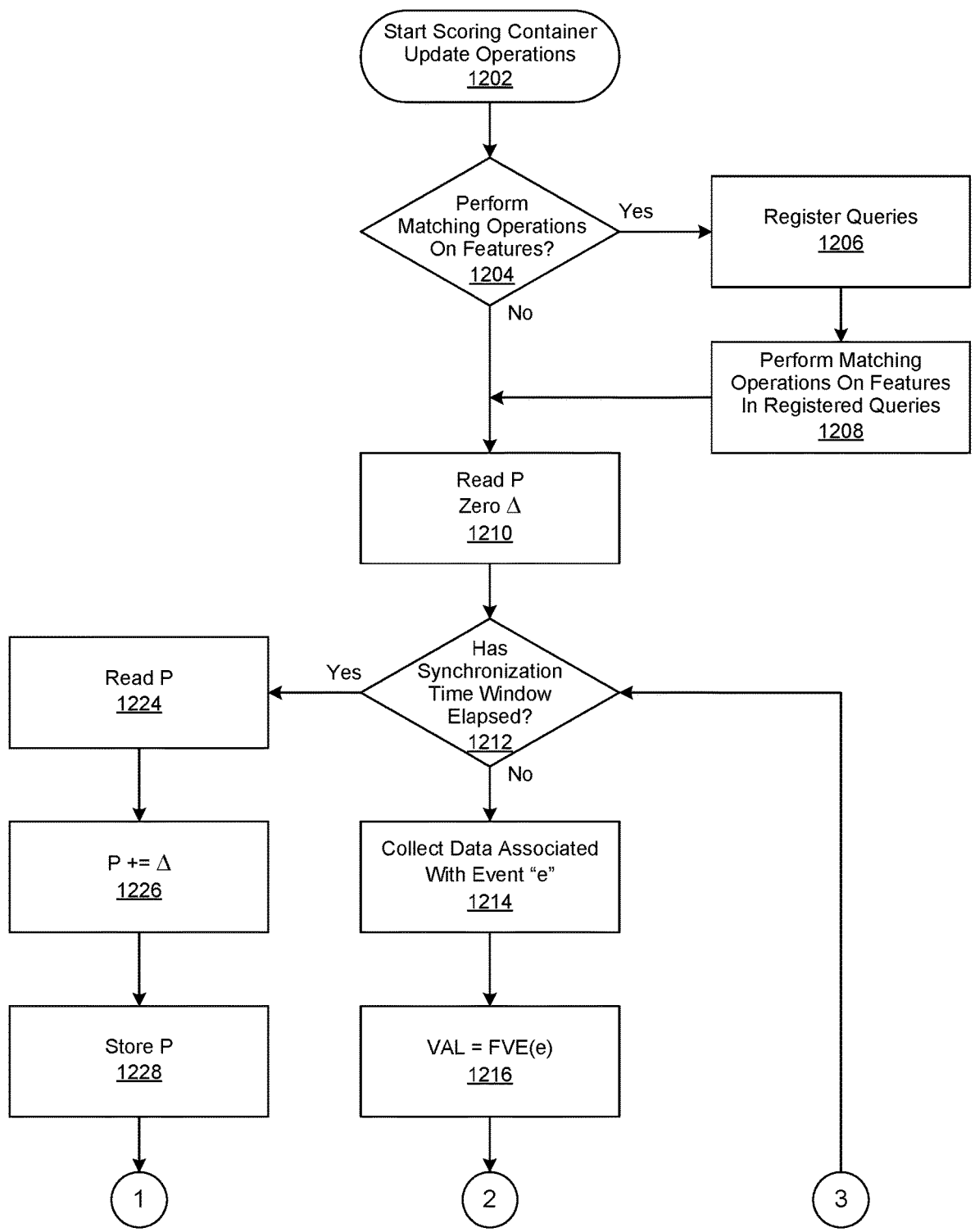
FIGS. 12a and 12b are a generalized flowchart of the performance of scoring container update operations.
Figure 12B:
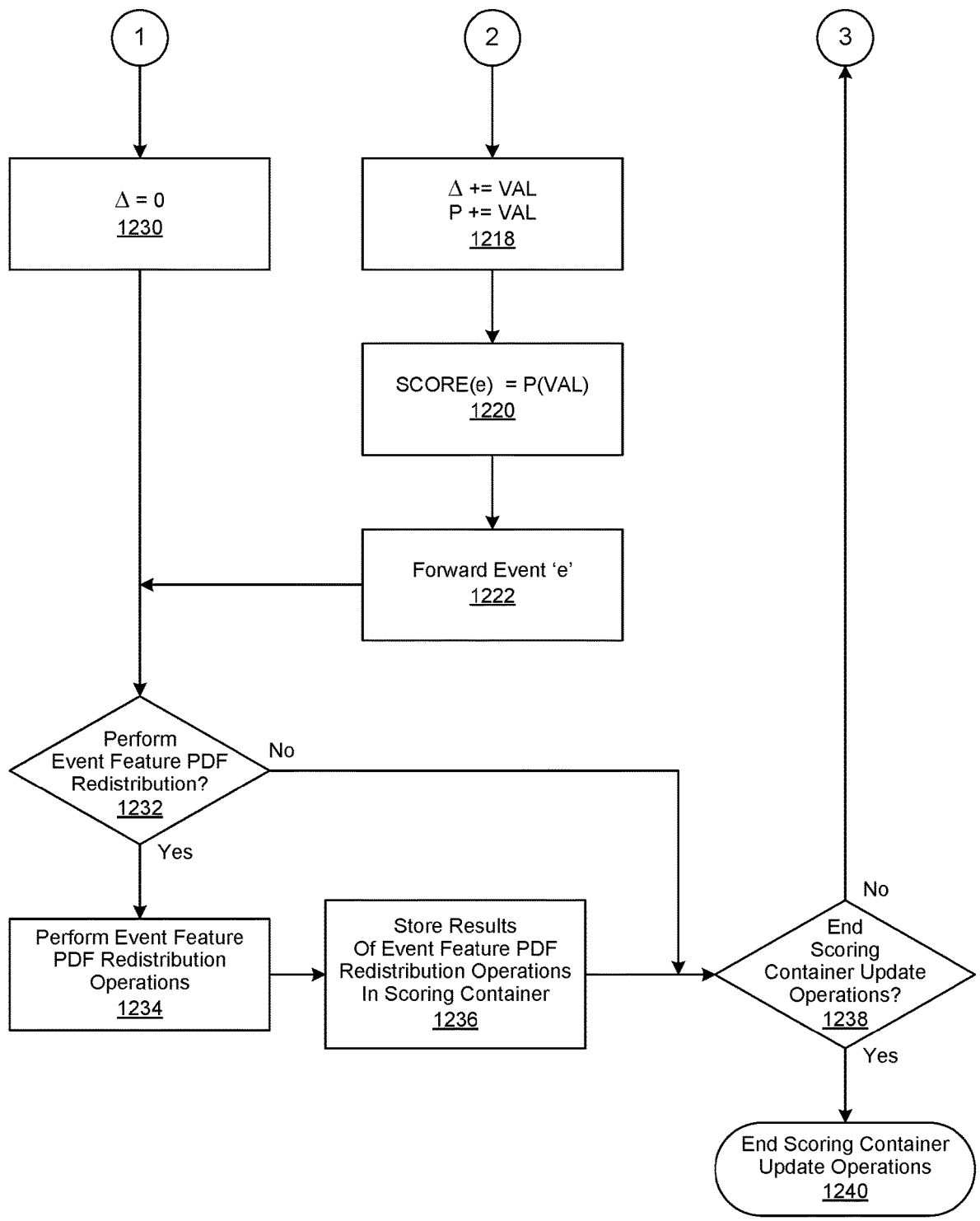

FIGS. 12a and 12b are a generalized flowchart of the performance of scoring container update operations implemented in accordance with an embodiment of the invention. In this embodiment, scoring container update operations are begun in step 1202, followed by a determination being made in step 1204 whether to perform matching operations on features, as described in greater detail herein. If so, the queries are registered in step 1206, as likewise described in greater detail herein, followed by the performance of matching operation on features within registered queries in step 1208. Thereafter, or if it was decided in step 1204 to not perform matching operations, the current value 'P' of a percentile scoring container is read, and the value of a corresponding delta scoring container is set to zero, in step 1210.

A determination is then made in step 1212 whether a synchronization time window has elapsed. If not, then various data associated with event e' is collected in step 1214, followed by setting the value of the data corresponding to the observed event as VAL=FVE(e) in step 1216. The resulting VAL associated with the data corresponding to the observed event is then added to the current value stored in the percentile and delta scoring containers. Thereafter, the score associated with the event is calculated in step 1220 as SCORE(e)=P(VAL), followed by forwarding data associated with event 'e' to a persistent datastore in step 1222.

However, if it was determined in step 1212 that a synchronizing time window has elapsed, then the value 'P for the percentile scoring container is read in step 1224, followed by the addition in step 1226 of the values currently stored in the delta scoring container. The resulting value 'P' of the percentile scoring container is then stored in step 1228, followed by setting the value of the delta scoring container to zero in step 1230. Thereafter, or after event 'e' has been forwarded in step 1222, a determination is made in step 1232 whether to perform event feature probability distribution function (PDF) redistribution processes, described in greater detail herein, on the contents of the container.

If not, then a determination is made in step 1238 whether to end scoring container update operations. If not, the process is continued, proceeding with step 1212. Otherwise, scoring container update operations are ended in step 1240. However, if it was determined in step 1232 to perform event feature PDF redistribution operations, then they are performed in step 1234. The results of the event feature PDF redistribution operations performed in step 1234 are then stored in the scoring container in step 1236 and the process is continued, proceeding with step 1240.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for constructing a distribution of interrelated event features, comprising:
   receiving a stream of events, the stream of events comprising a plurality of events;
   extracting features from the plurality of events;
   constructing a distribution of the features from the plurality of events, the distribution of the features comprising a probability density function distribution of features over a series of time windows;
   analyzing the distribution of the features from the plurality of events;
   dynamically reweighting the distribution of the features to scale a number of events contained within the distribution; and,
   enriching data associated with each of the plurality of events prior to extracting features from the plurality of events; and wherein
   the enriching data comprises at least one of
      validating event data associated with at least some of the plurality of events,
      disclaiming certain event data associated with at least some of the plurality of events;
      deduplicating at least some of the plurality of events;
      performing an entity resolution operation on at least some of the plurality of events;
      performing an attachment enrichment operation on data associated with at least some of the plurality of events; and,
      performing a domain enrichment on at least some of the plurality of events.

2. The method of claim 1, further comprising:
   labeling at least some of the plurality of events prior to extracting features from the plurality of events.

3. The method of claim 1, wherein:
   the extracting features comprises performing transformation operations on certain features associated with an event to generate a smaller set of derived features.

4. The method of claim 1, further comprising:
   processing a query relating to the plurality of events, the processing the query being performed via a streaming query framework.

5. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      receiving a stream of events, the stream of events comprising a plurality of events;
      extracting features from the plurality of events;
      constructing a distribution of the features from the plurality of events, the distribution of the features comprising a probability density function distribution of features over a series of time windows;
      analyzing the distribution of the features from the plurality of events:
      dynamically reweighting the distribution of the features to scale a number of events contained within the distribution; and,
      enriching data associated with each of the plurality of events prior to extracting features from the plurality of events; and wherein
      the enriching data comprises at least one of
         validating event data associated with at least some of the plurality of events,
         disclaiming certain event data associated with at least some of the plurality of events;
         deduplicating at least some of the plurality of events;
         performing an entity resolution operation on at least some of the plurality of events;
         performing an attachment enrichment operation on data associated with at least some of the plurality of events; and,
         performing a domain enrichment on at least some of the plurality of events.

6. The system of claim 5, wherein the instructions are further configured for:
   labeling at least some of the plurality of events prior to extracting features from the plurality of events.

7. The system of claim 5, wherein:
   the extracting features comprises performing transformation operations on certain features associated with an event to generate a smaller set of derived features.

8. The system of claim 5, wherein the instructions are further configured for:
   processing a query relating to the plurality of events, the processing the query being performed via a streaming query framework.

9. A non-transitory, computer-readable storage medium embodying computer program code, the computer program code comprising computer executable instructions configured for:
   receiving a stream of events, the stream of events comprising a plurality of events;
   extracting features from the plurality of events;
   constructing a distribution of the features from the plurality of events, the distribution of the features comprising a probability density function distribution of features over a series of time windows;
   analyzing the distribution of the features from the plurality of events;

dynamically reweighting the distribution of the features to scale a number of events contained within the distribution; and, enriching data associated with each of the plurality of events prior to extracting features from the plurality of events; and wherein the enriching data comprises at least one of
  validating event data associated with at least some of the plurality of events,
  disclaiming certain event data associated with at least some of the plurality of events;
  deduplicating at least some of the plurality of events;
  performing an entity resolution operation on at least some of the plurality of events;
  performing an attachment enrichment operation on data associated with at least some of the plurality of events; and,
  performing a domain enrichment on at least some of the plurality of events.

10. The non-transitory, computer-readable storage medium of claim 9, wherein the computer executable instructions are further configured for:

labeling at least some of the plurality of events prior to extracting features from the plurality of events.

11. The non-transitory, computer-readable storage medium of claim 9, wherein:

the extracting features comprises performing transformation operations on certain features associated with an event to generate a smaller set of derived features.

12. The non-transitory, computer-readable storage medium of claim 9, wherein the computer executable instructions are further configured for:

processing a query relating to the plurality of events, the processing the query being performed via a streaming query framework.

13. The non-transitory, computer-readable storage medium of claim 9, wherein the computer executable instructions are deployable to a client system from a server system at a remote location.

14. The non-transitory, computer-readable storage medium of claim 9, wherein the computer executable instructions are provided by a service provider to a user on an on-demand basis.

* * * * *